US007270064B2

(12) United States Patent
Kjelsson et al.

(10) Patent No.: US 7,270,064 B2
(45) Date of Patent: Sep. 18, 2007

(54) APPARATUS FOR DISCRETE DISTRIBUTION OF GRANULES

(75) Inventors: Mats Kjelsson, Horby (SE); Crister Stark, Vaderstad (SE)

(73) Assignee: Vaderstad-Verken AB, Vaderstad (SE)

( * ) Notice: Subject to any disclaimer, the term of this patent is extended or adjusted under 35 U.S.C. 154(b) by 253 days.

(21) Appl. No.: 10/520,070

(22) PCT Filed: Jun. 5, 2003

(86) PCT No.: PCT/SE03/00925

§ 371 (c)(1),
(2), (4) Date: Jan. 5, 2005

(87) PCT Pub. No.: WO2004/004441

PCT Pub. Date: Jan. 15, 2004

(65) Prior Publication Data

US 2005/0252431 A1 Nov. 17, 2005

(30) Foreign Application Priority Data

Jul. 5, 2002 (SE) .................................. 0202131

(51) Int. Cl.
*A01C 7/00* (2006.01)
*A01C 9/00* (2006.01)
(52) U.S. Cl. ..................................................... 111/174

(58) Field of Classification Search ......... 111/170–174
See application file for complete search history.

(56) References Cited

U.S. PATENT DOCUMENTS

| 3,195,485 | A | 7/1965 | Reynolds |
| 3,548,765 | A | 12/1970 | Grataloup |
| 4,002,266 | A | 1/1977 | Beebe |
| 4,145,981 | A | 3/1979 | Jimenez |
| 4,403,713 | A | 9/1983 | Herriau |

FOREIGN PATENT DOCUMENTS

| DE | 196 36 787 | 4/1998 |
| EP | 0 350 634 | 1/1990 |
| EP | 0 583 571 | 2/1994 |
| EP | 1 234 489 | 8/2002 |

*Primary Examiner*—Christopher J. Novosad
(74) *Attorney, Agent, or Firm*—Young & Thompson

(57) ABSTRACT

An apparatus for discrete distribution of granules, such as seed, fertilizer or the like includes a path forming device having an inlet (6) adapted to be associated with a granules container of an agricultural machine, and an outlet (7) adapted to be associated with a coulter of the agricultural machine. The path (25) is defined by at least one wall extending on either side of and along at least a part of the extension of the path, wherein the path is formed about a substantially vertical axis. Also included is an agricultural machine (10) provided with such an apparatus.

29 Claims, 33 Drawing Sheets

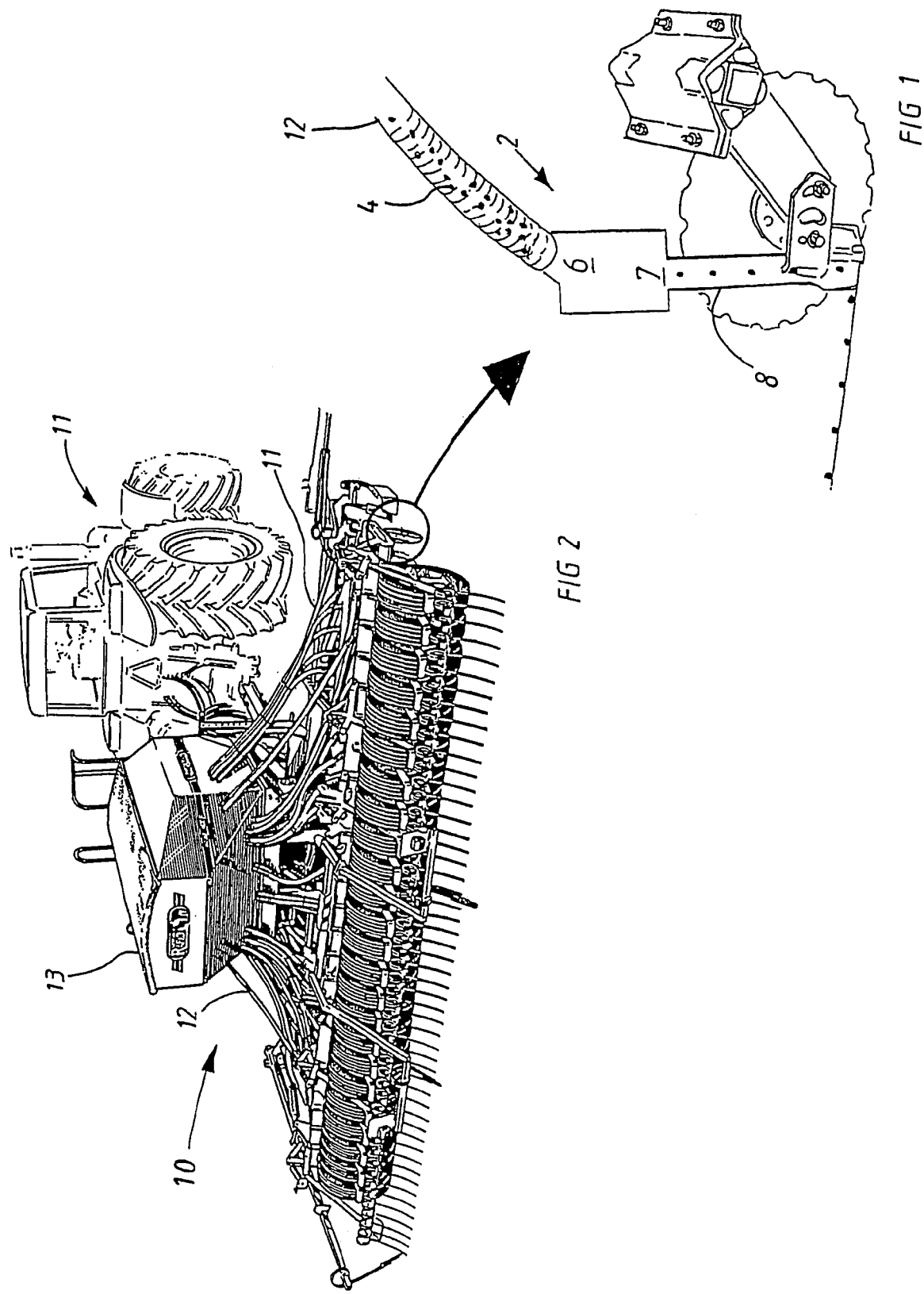

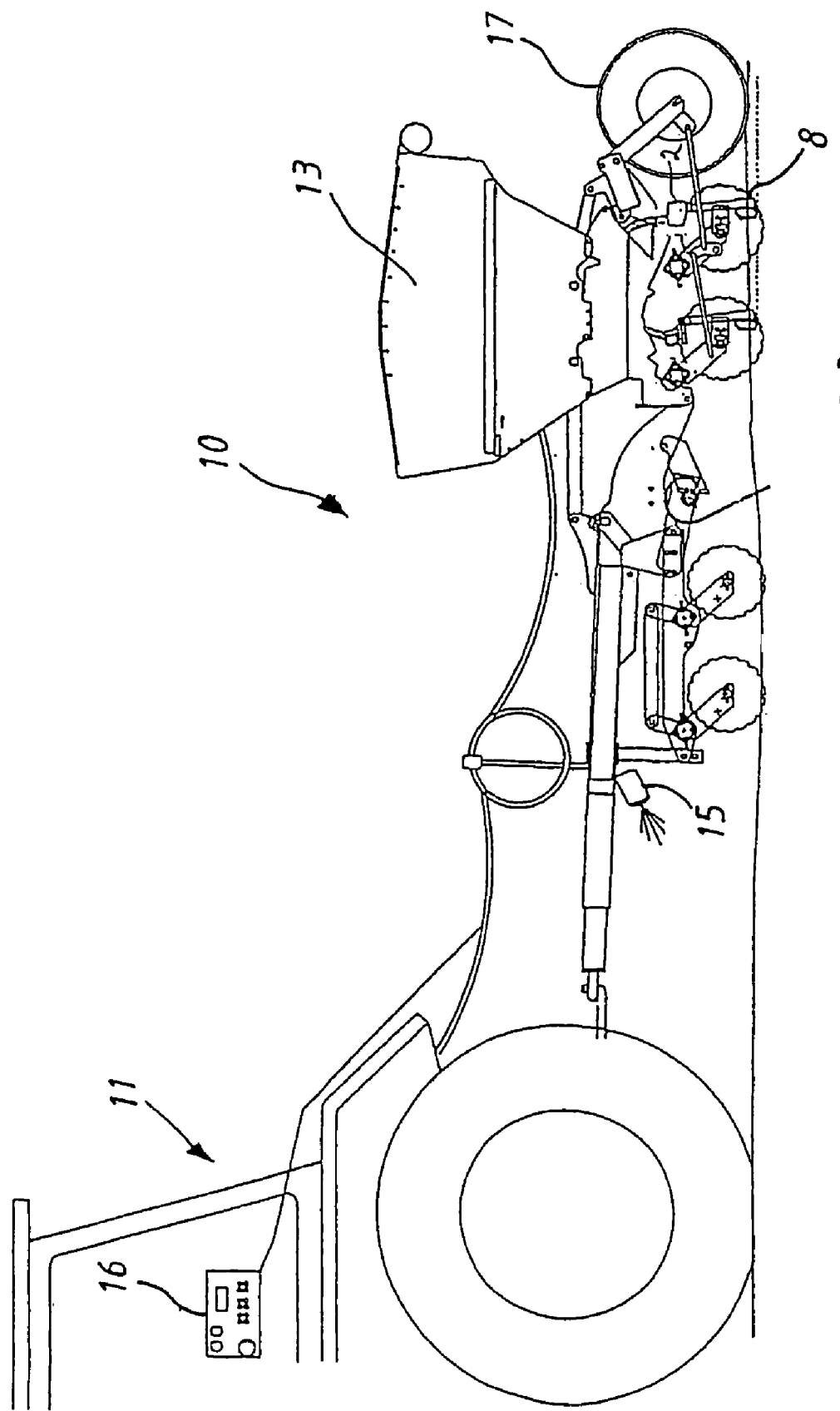

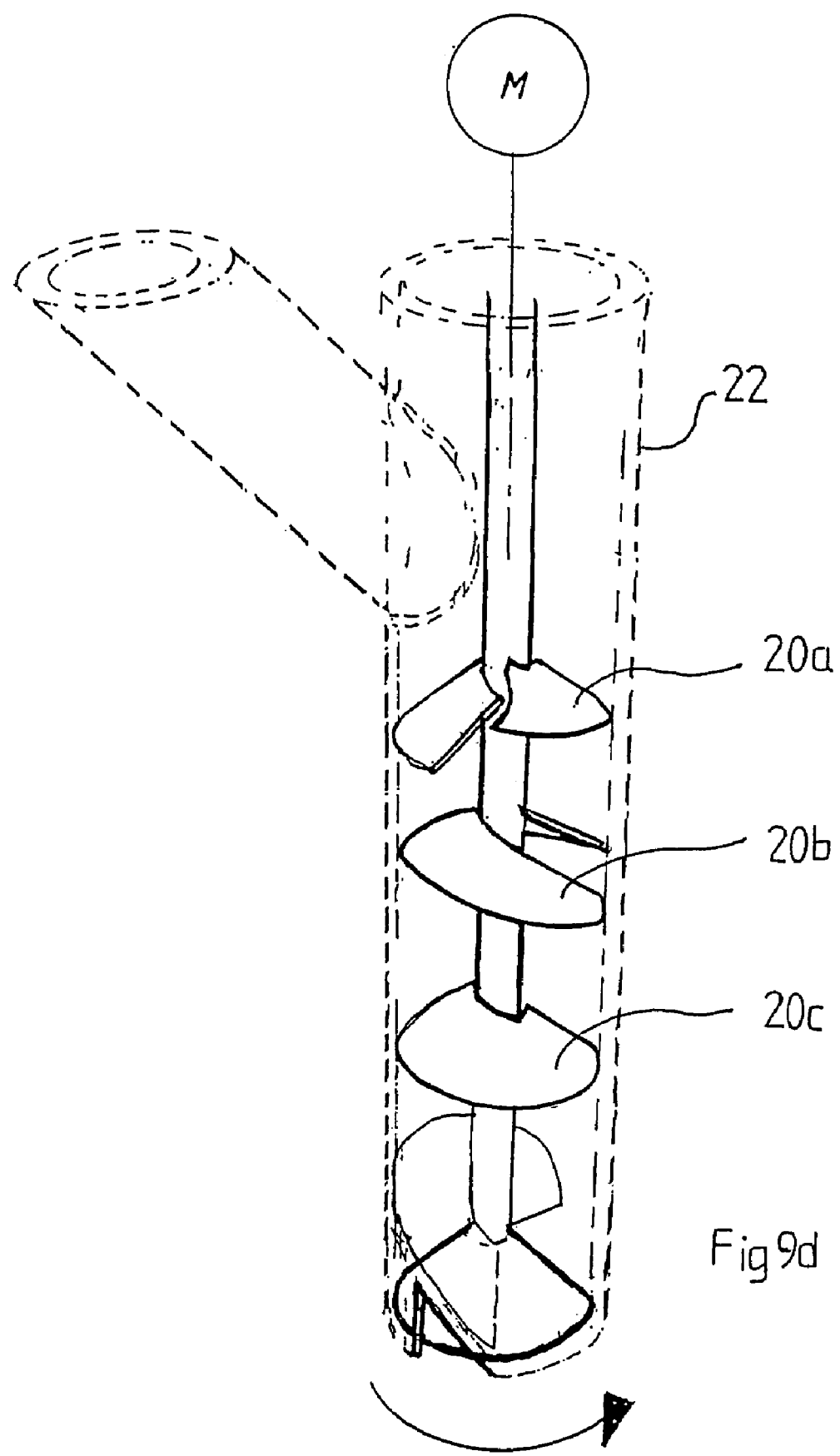

APPARATUS FOR DISCRETE DISTRIBUTION OF GRANULES

TECHNICAL BACKGROUND

The present invention relates to an apparatus for discrete distribution of granules, such as seed, fertiliser or the like comprising a path forming device having an inlet adapted to be associated with a granules container of an agricultural machine, and an outlet adapted to be associated with a coulter of the agricultural machine.

The invention also relates to an agricultural machine comprising a granules container for granules, such as seed, fertiliser or the like, a coulter for placing granules at a predetermined depth in the soil, comprising such an apparatus for distribution of granules, said apparatus for distribution of granules being associated with the container and with the coulter.

Such a device for distributing granules and such an agricultural machine is known from SU-A-106 473, EP-A-0 350 634, EP-A-0 583 571 and DE-C-196 36 787, respectively. The devices described in these documents suffer from the disadvantage that the respective granules are not distributed evenly in the soil.

For as long man has been producing sowing machinery, there has always been a need to improve the distribution of the seeds in the seed rows. Known mechanical and pneumatic systems give an uneven distribution of the granules in a furrow in the soil worked by a seed coulter or a fertiliser coulter. The granules tend to collect near to each other or to be set too far apart from each other. Maize and soya among other crops are sensitive to uneven distribution, for which reason precision sowing machines, which are expensive and slow, are used for such crops.

SUMMARY OF THE INVENTION

One object of the present invention is to obtain substantially the same growth conditions in the form of light, water and nutrition for the plants. This has been achieved with an agricultural machine and an apparatus of the type mentioned at the outset, wherein said path is defined by at least one wall extending on either sides of and along at least a part of the extension of said path, wherein said path is formed about a substantially vertical axis. Hereby, an even distribution of the granules is achieved.

DRAWING SUMMARY

Figure 4:
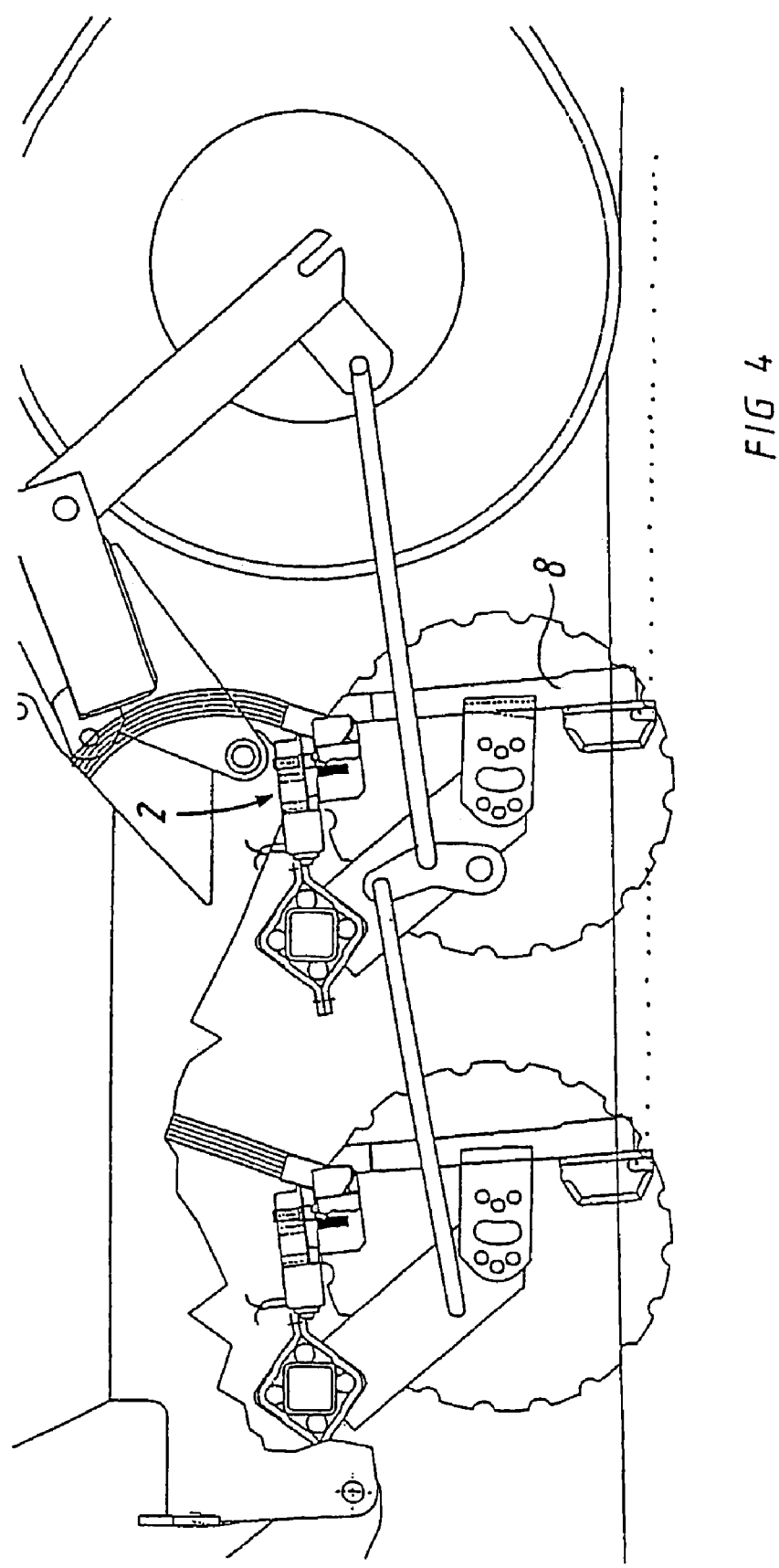
Figure 5A:
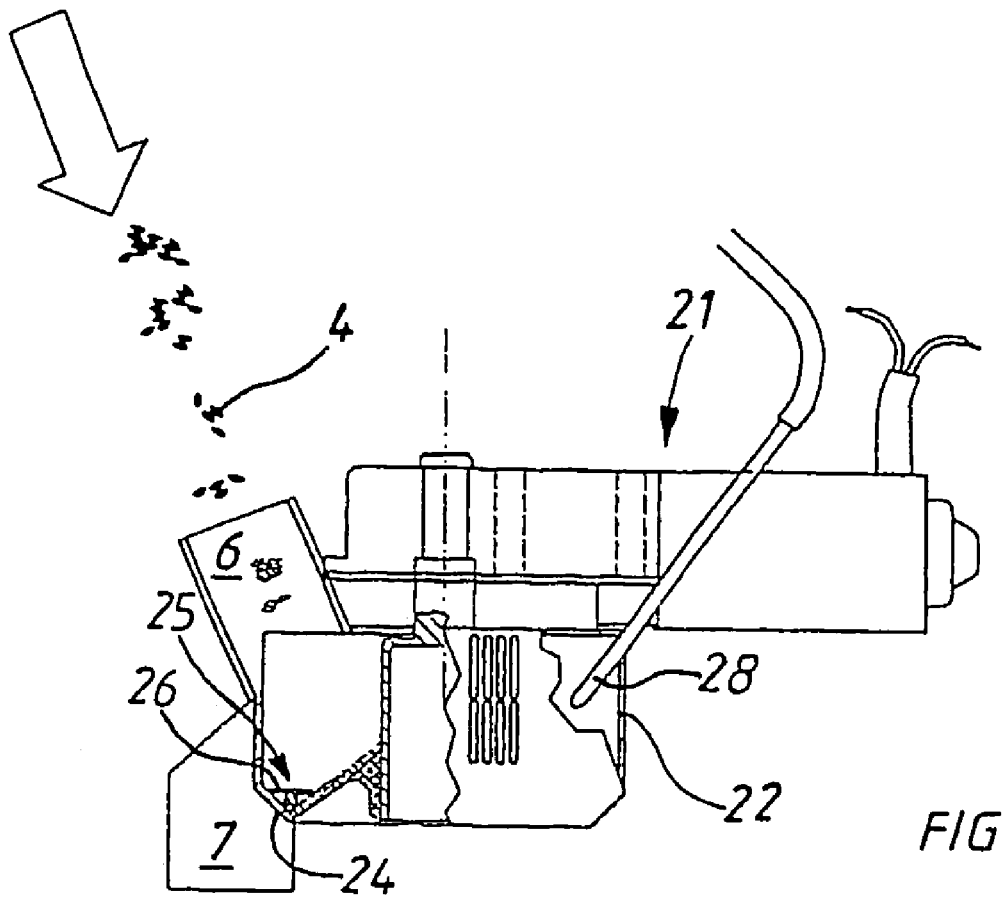
Figure 5B:
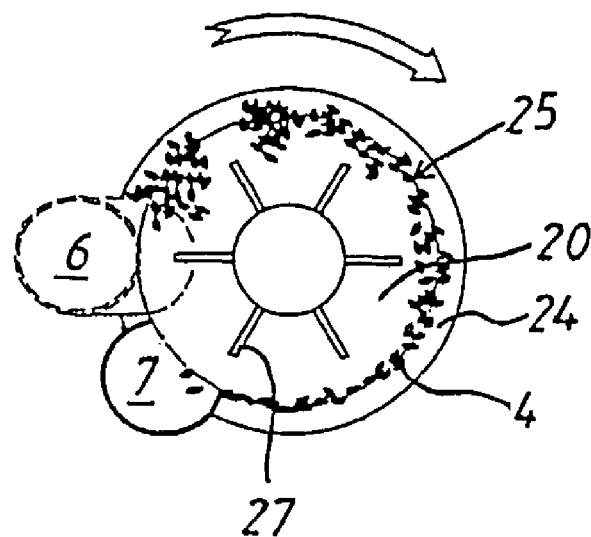
Figure 5B:
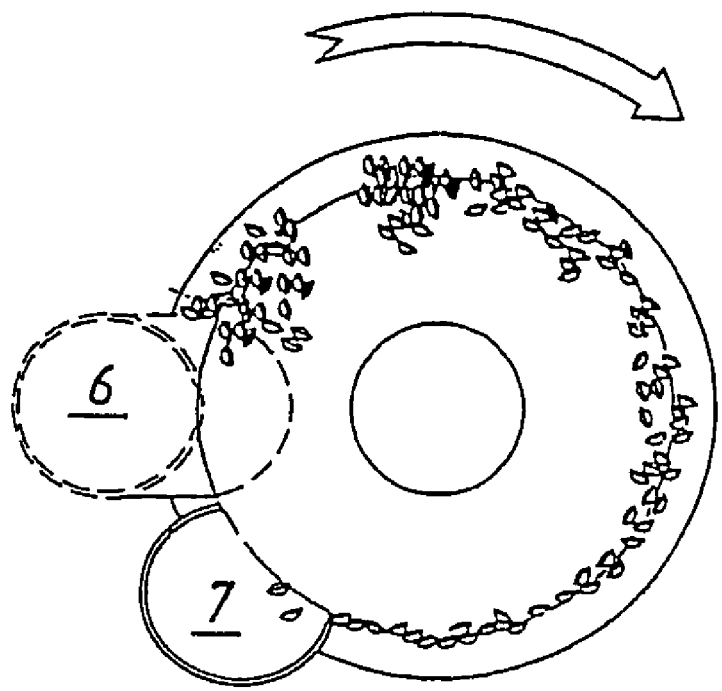
Figure 5C:
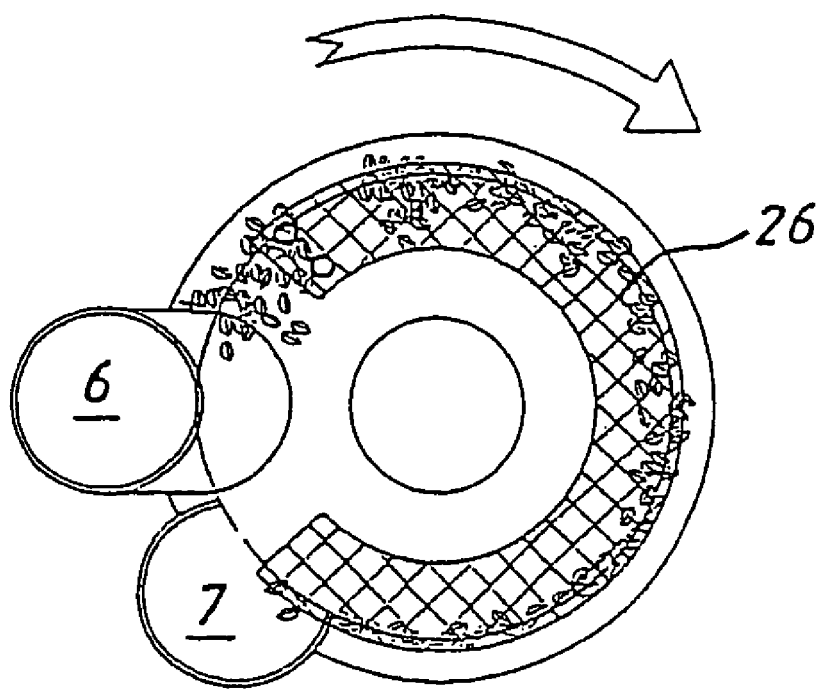
Figure 6A:
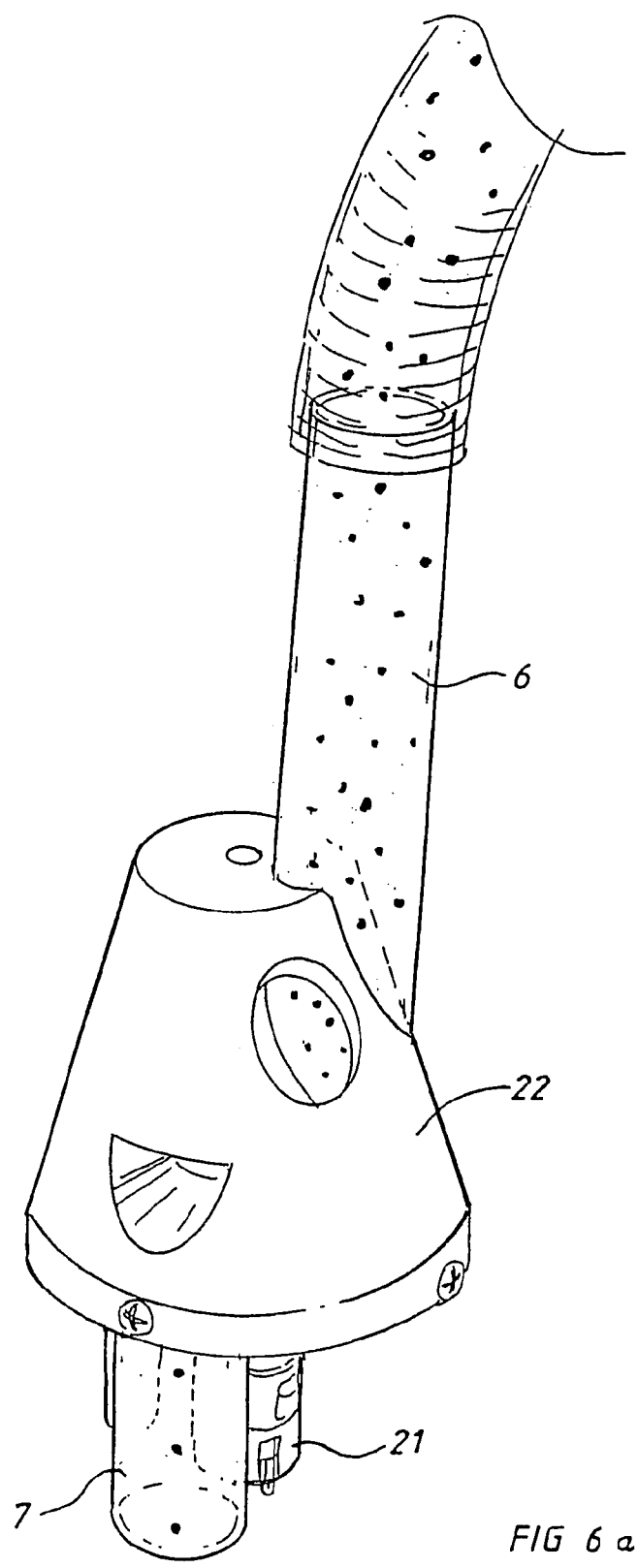
Figure 6:
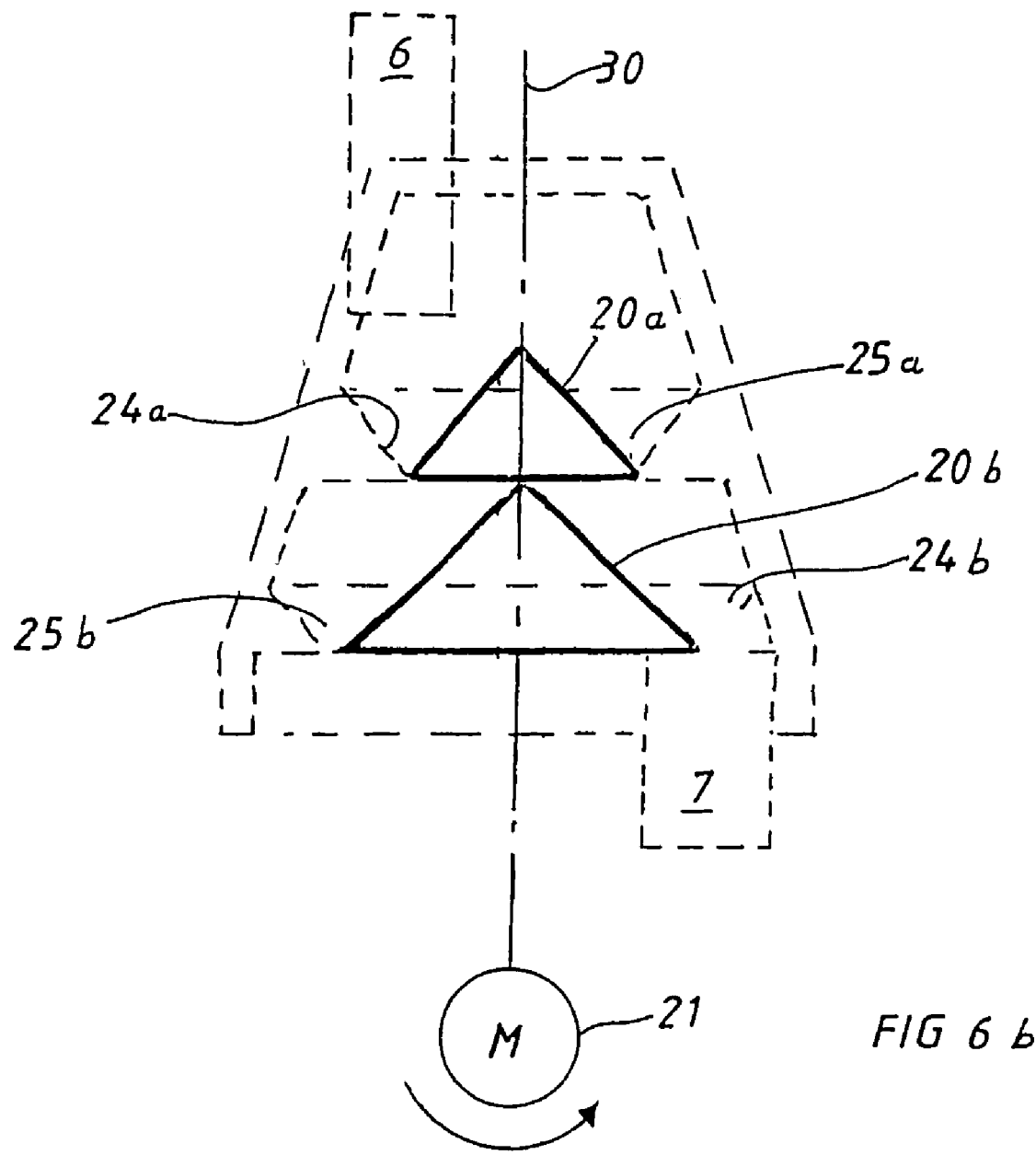
Figure 6C:
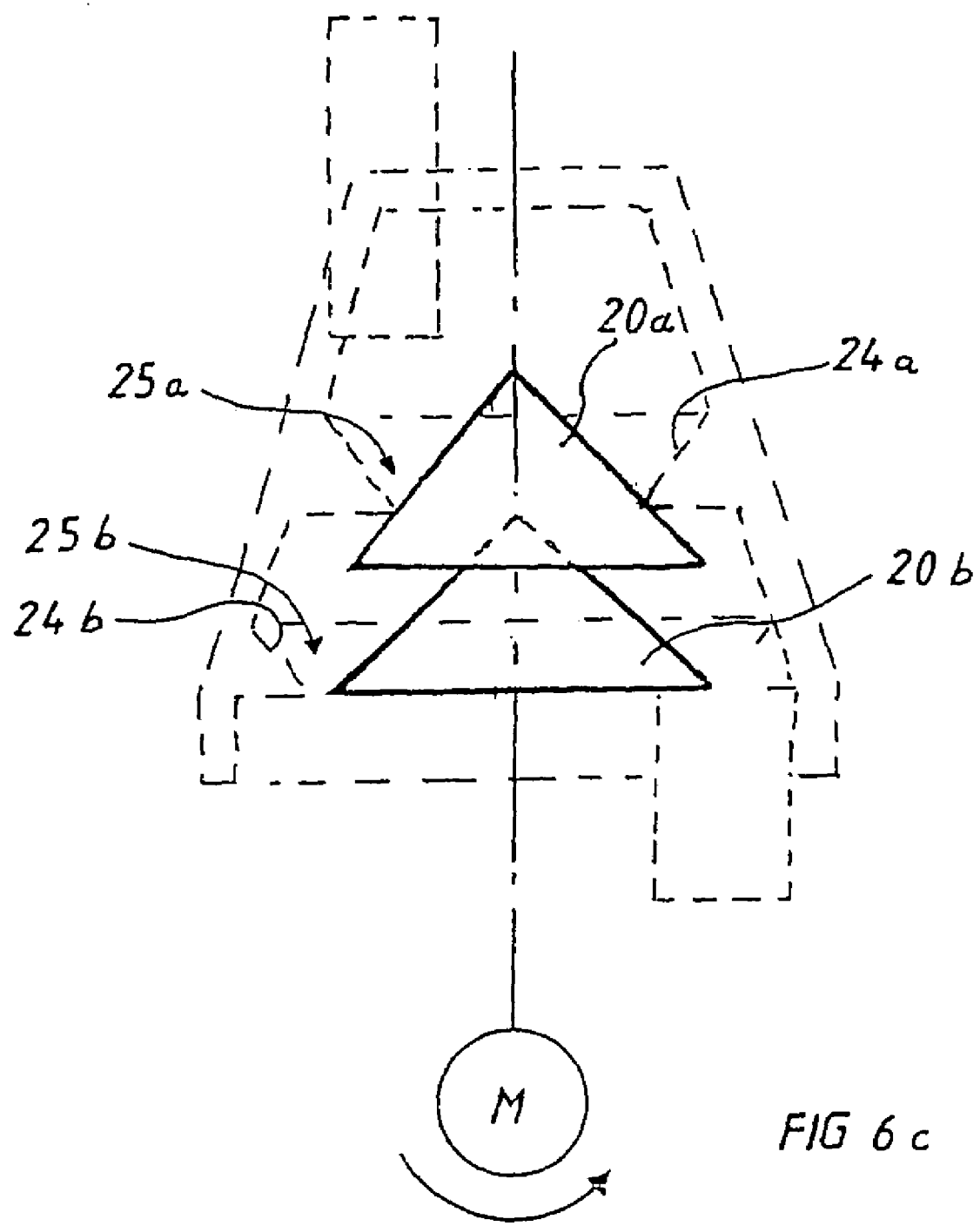
Figure 6D:
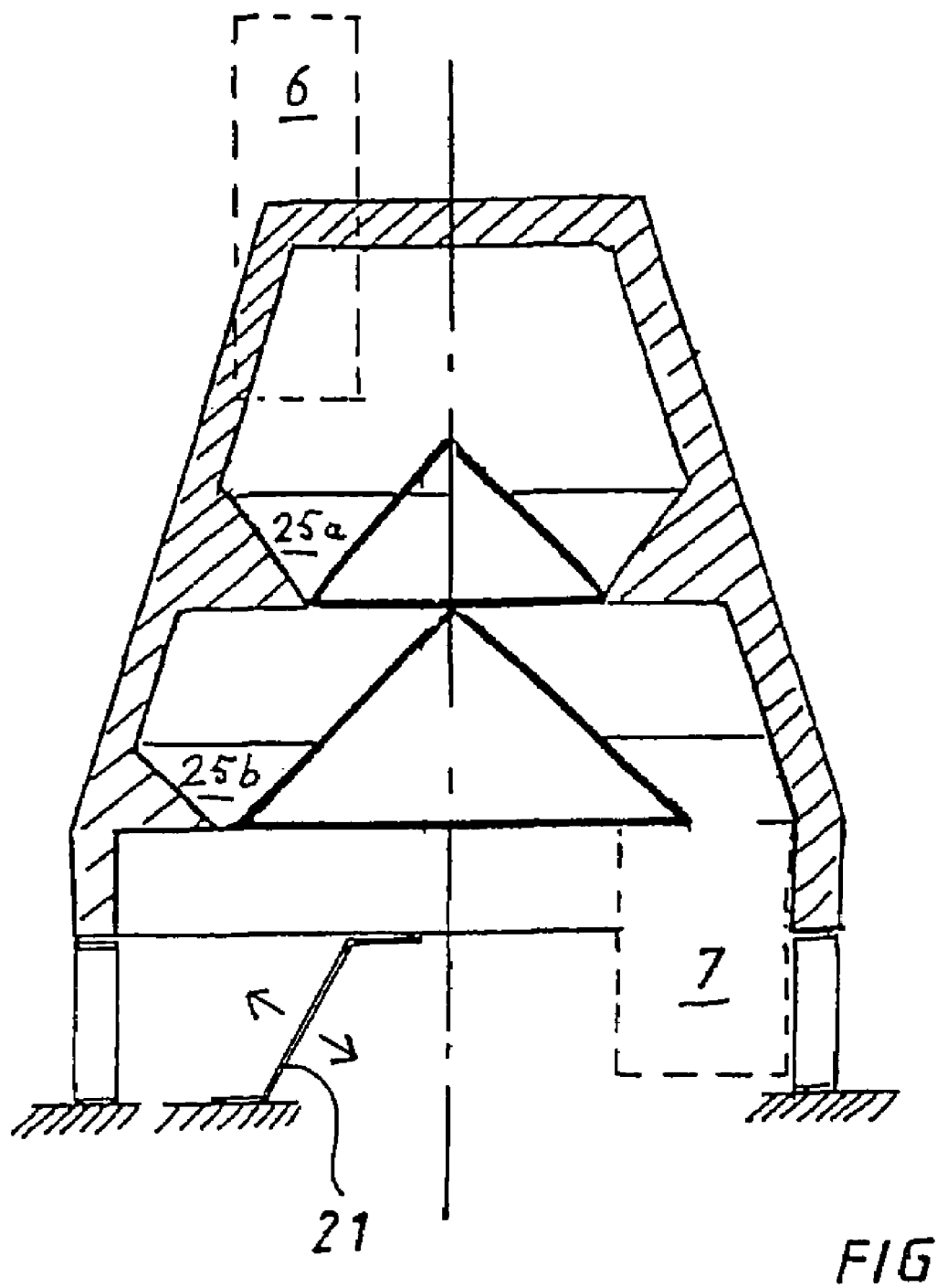
Figure 7:
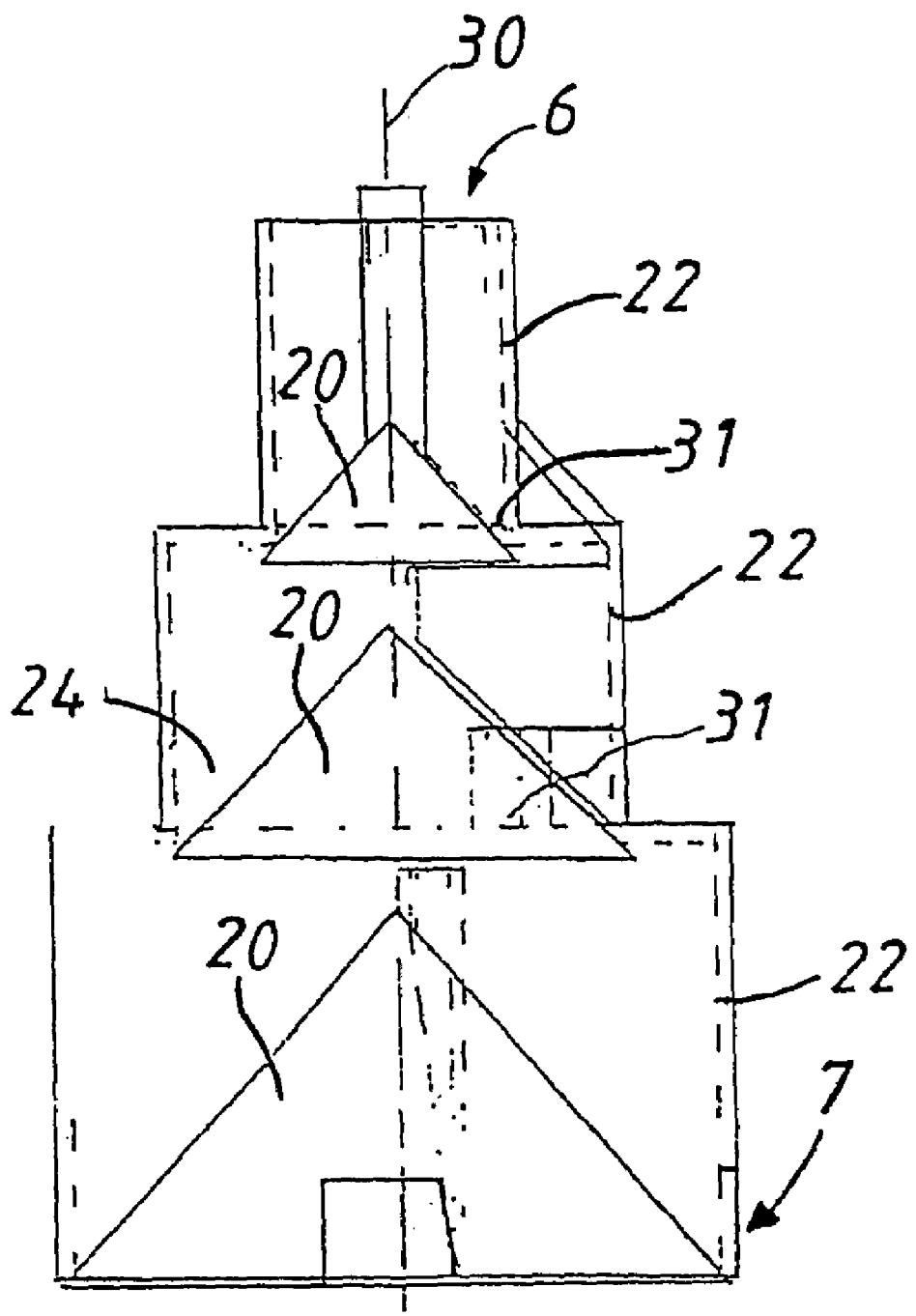
Figures 11A, 11B, 11C:
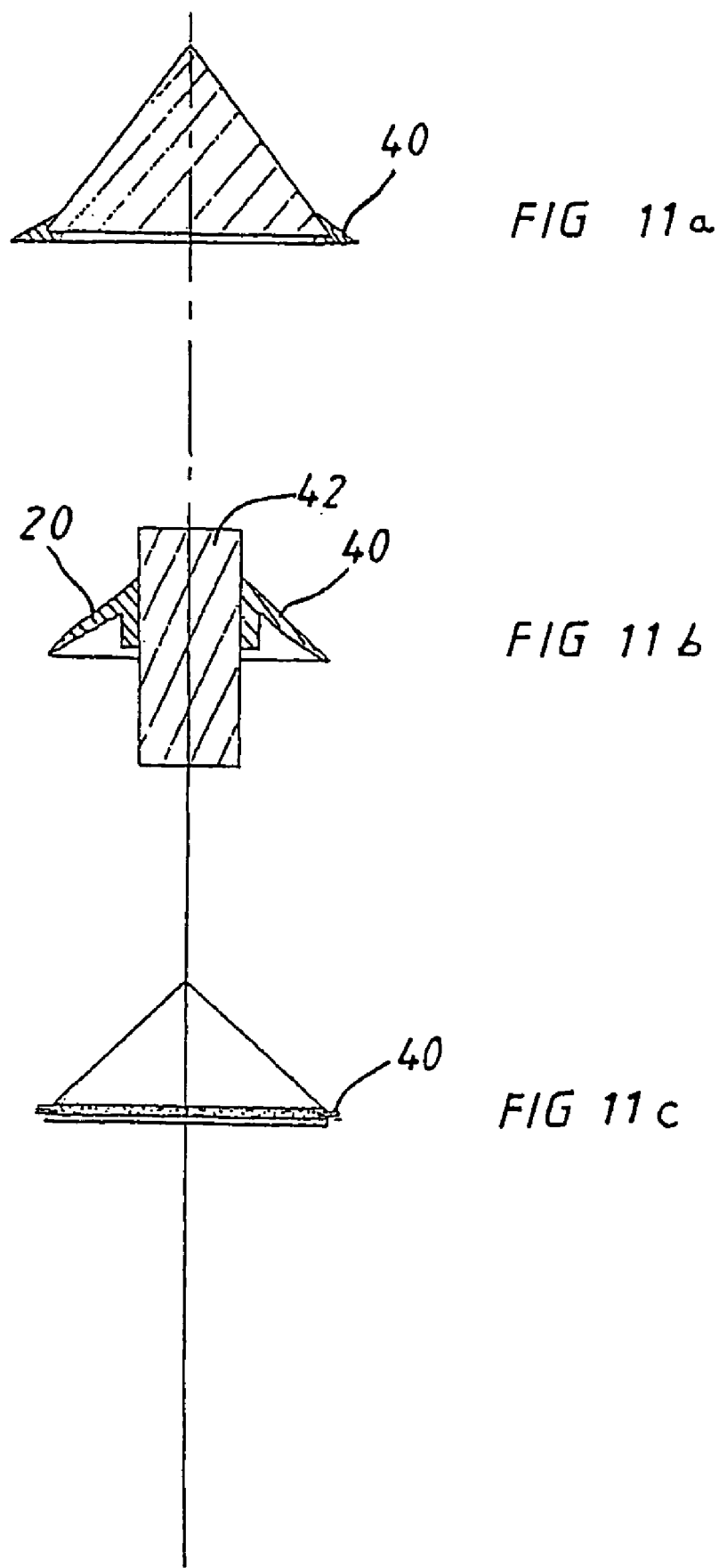
Figure 12:
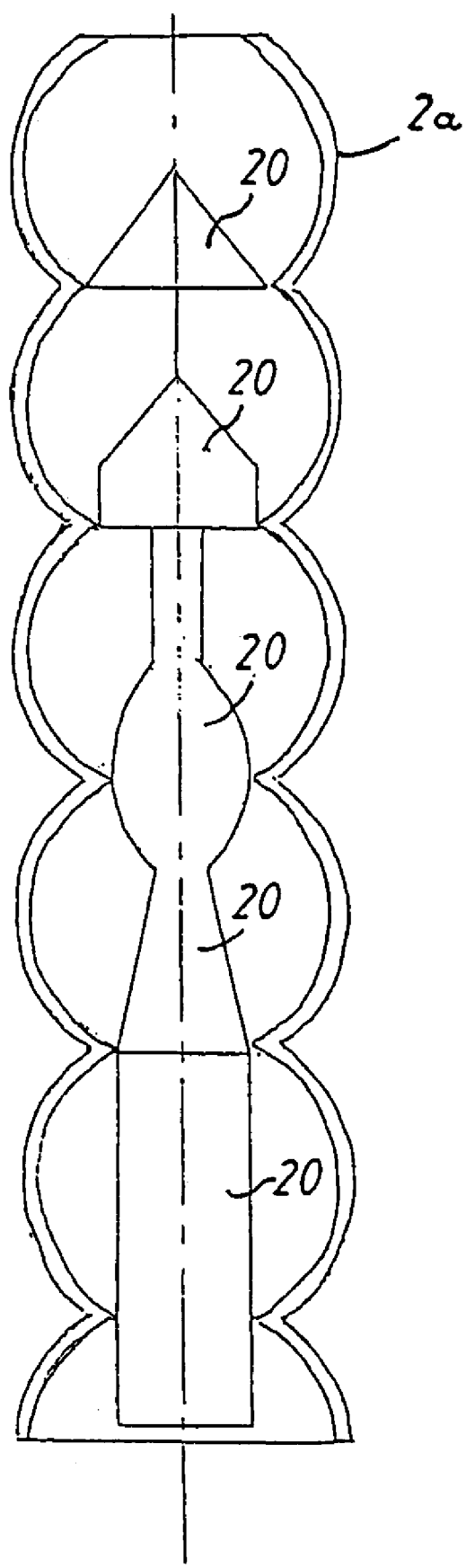
Figure 13:
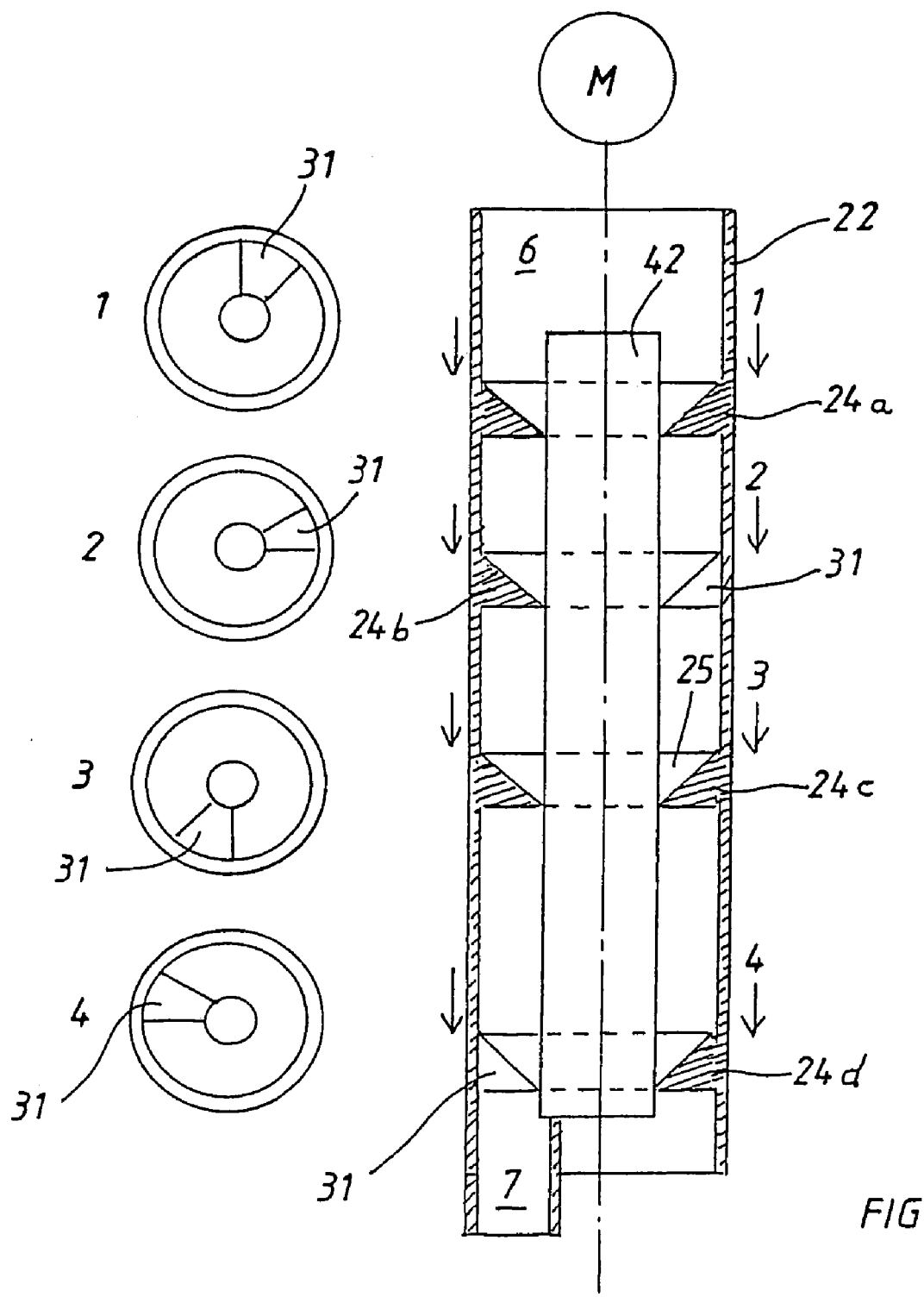
Figure 14:
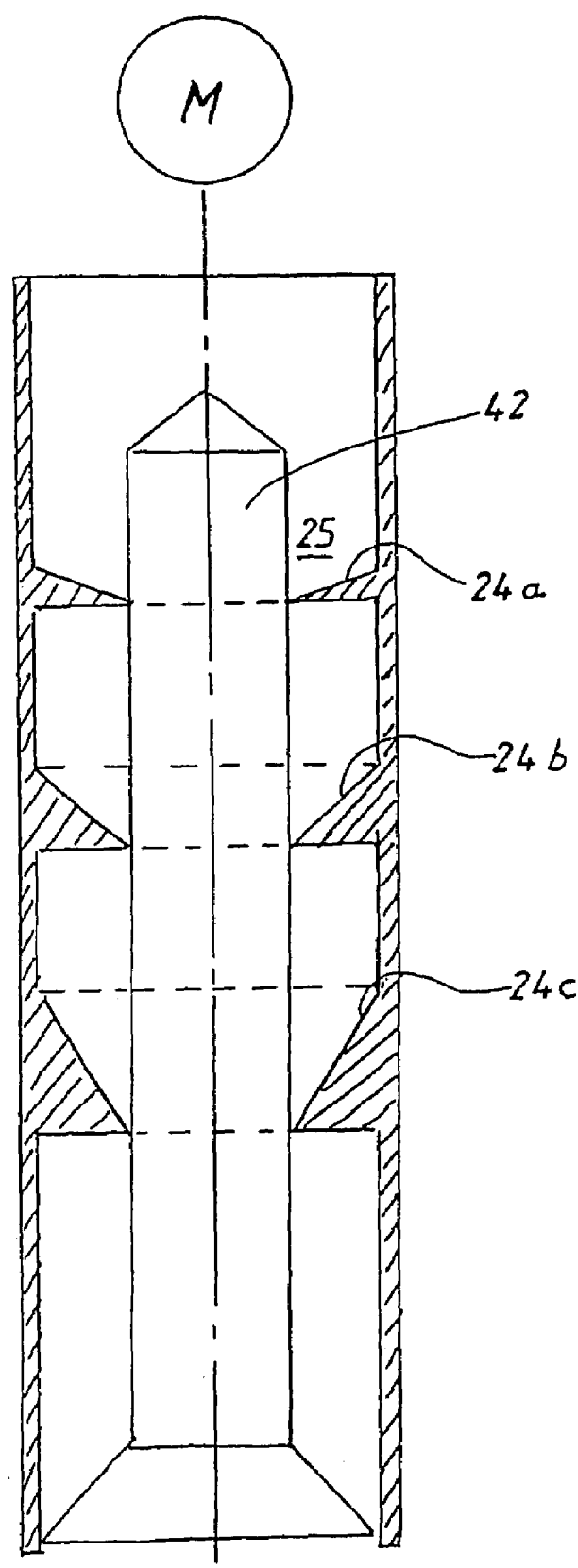
Figure 15A:
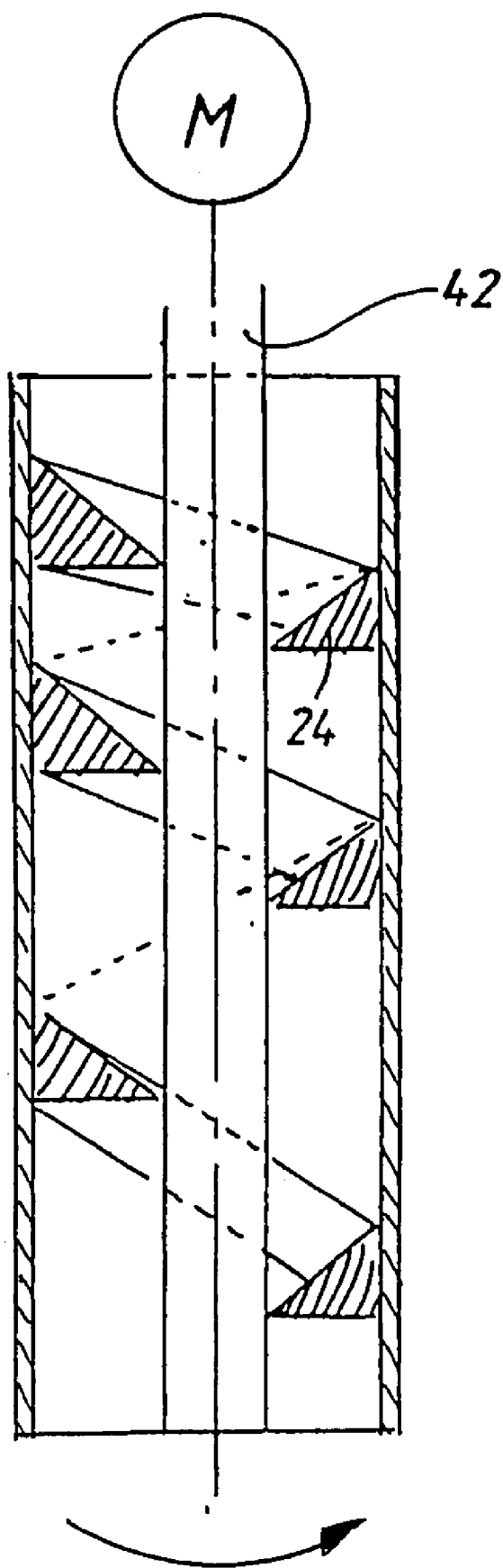
Figure 15:
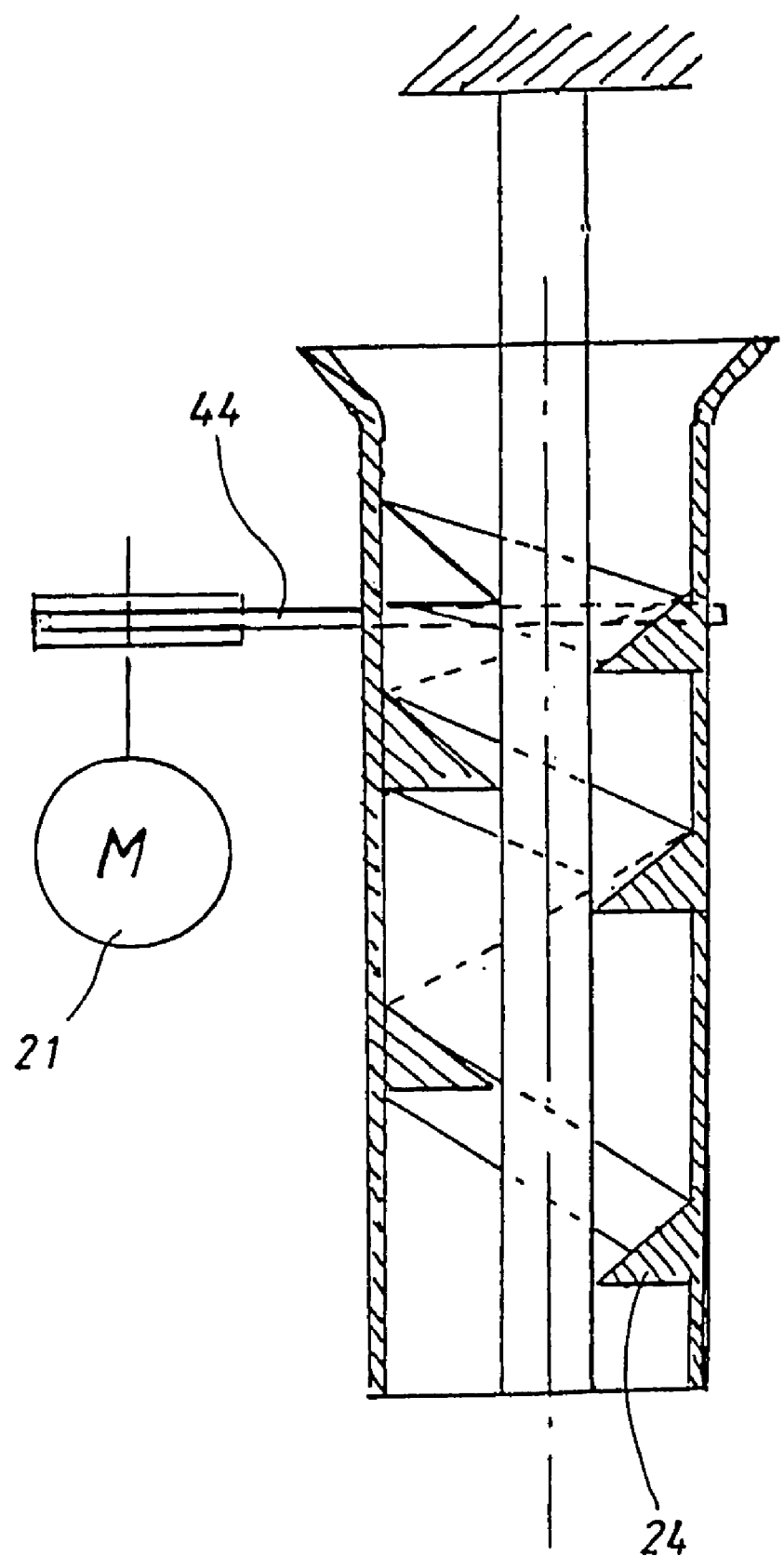
Figure 16:
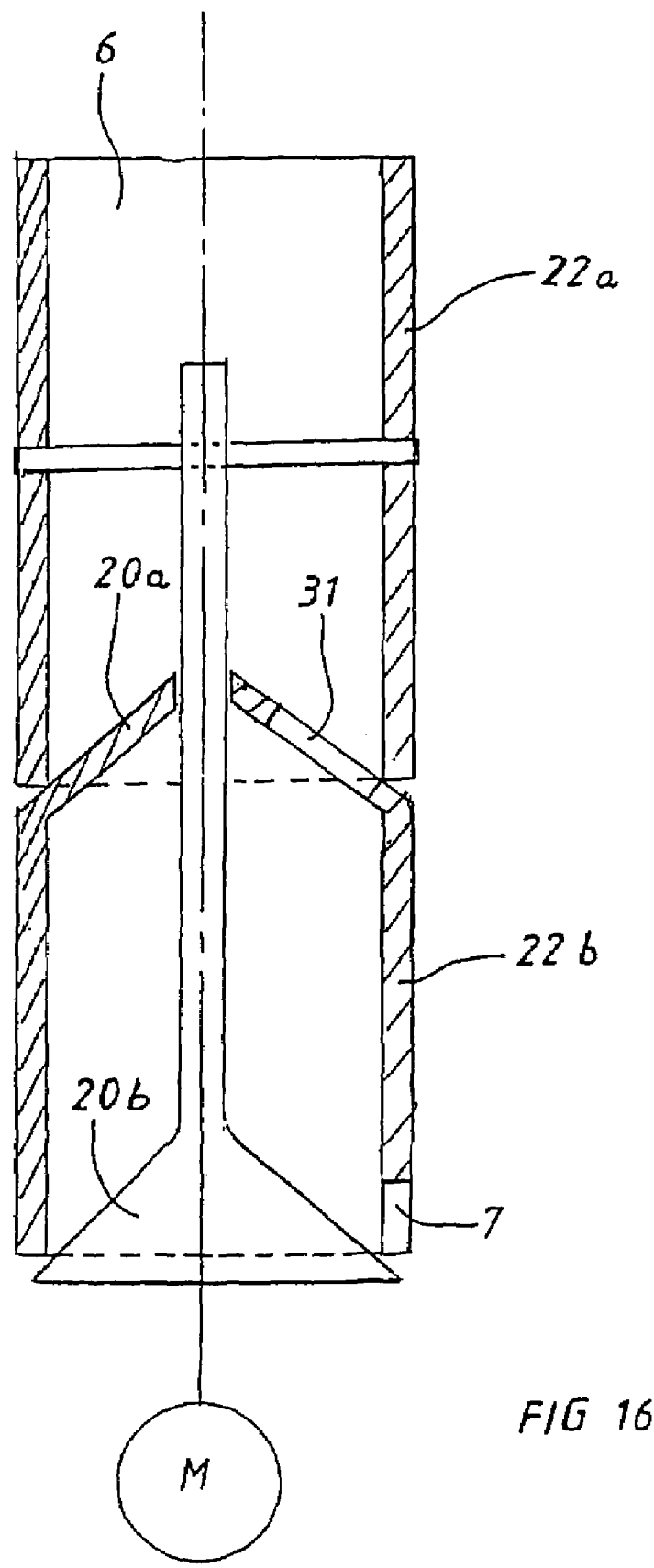
Figure 17A:
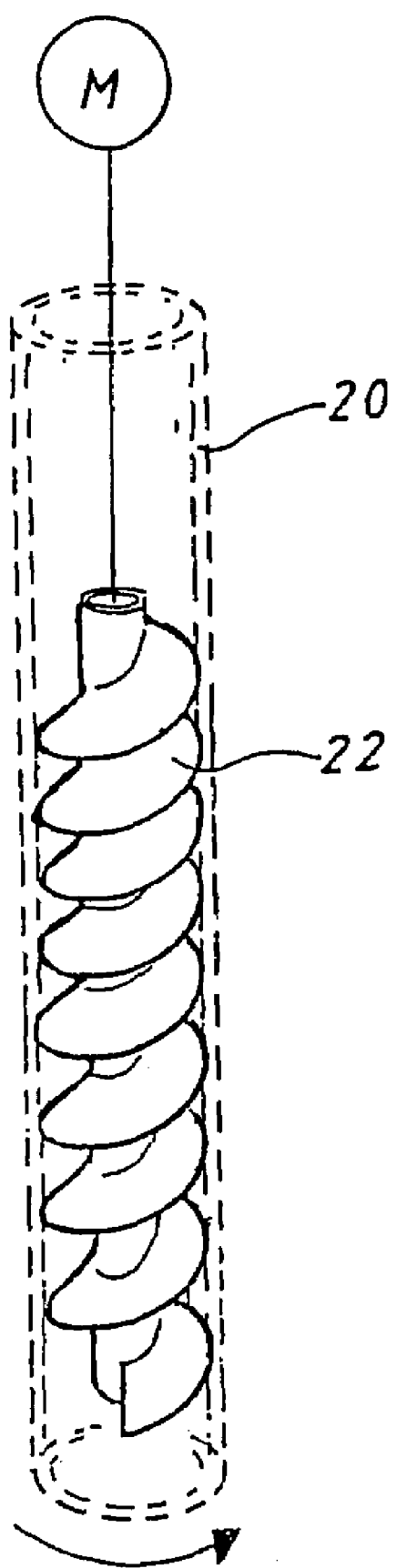
Figure 17B:
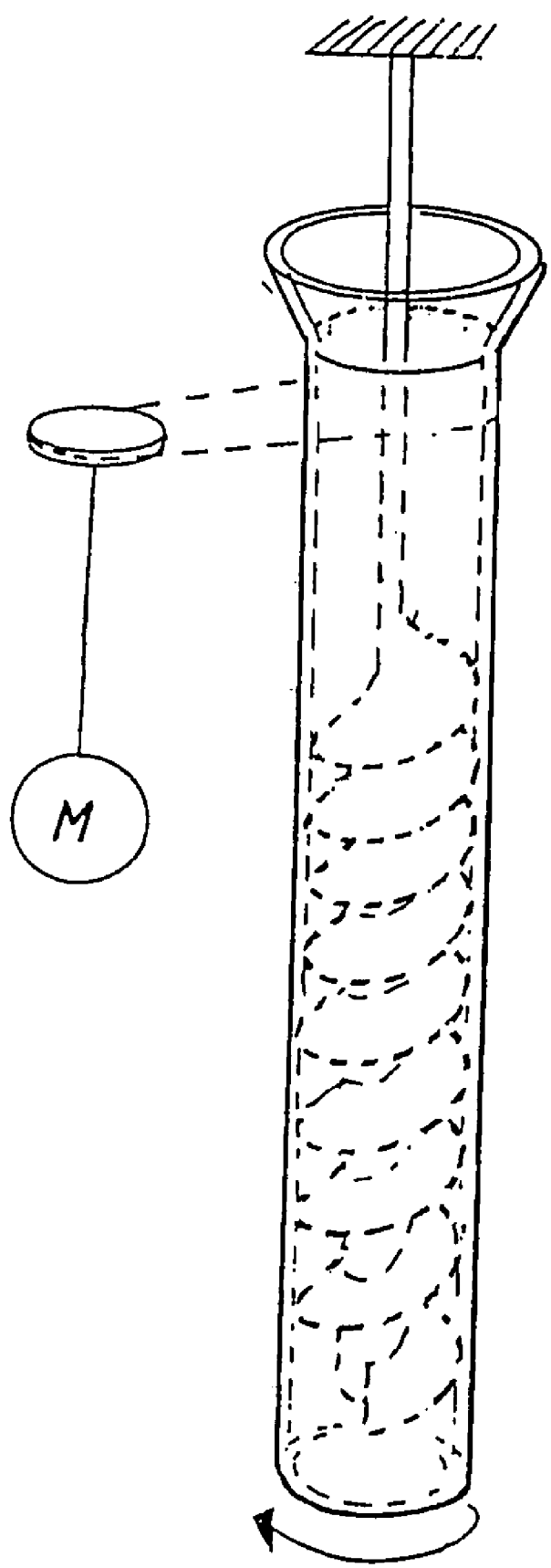
Figure 18:
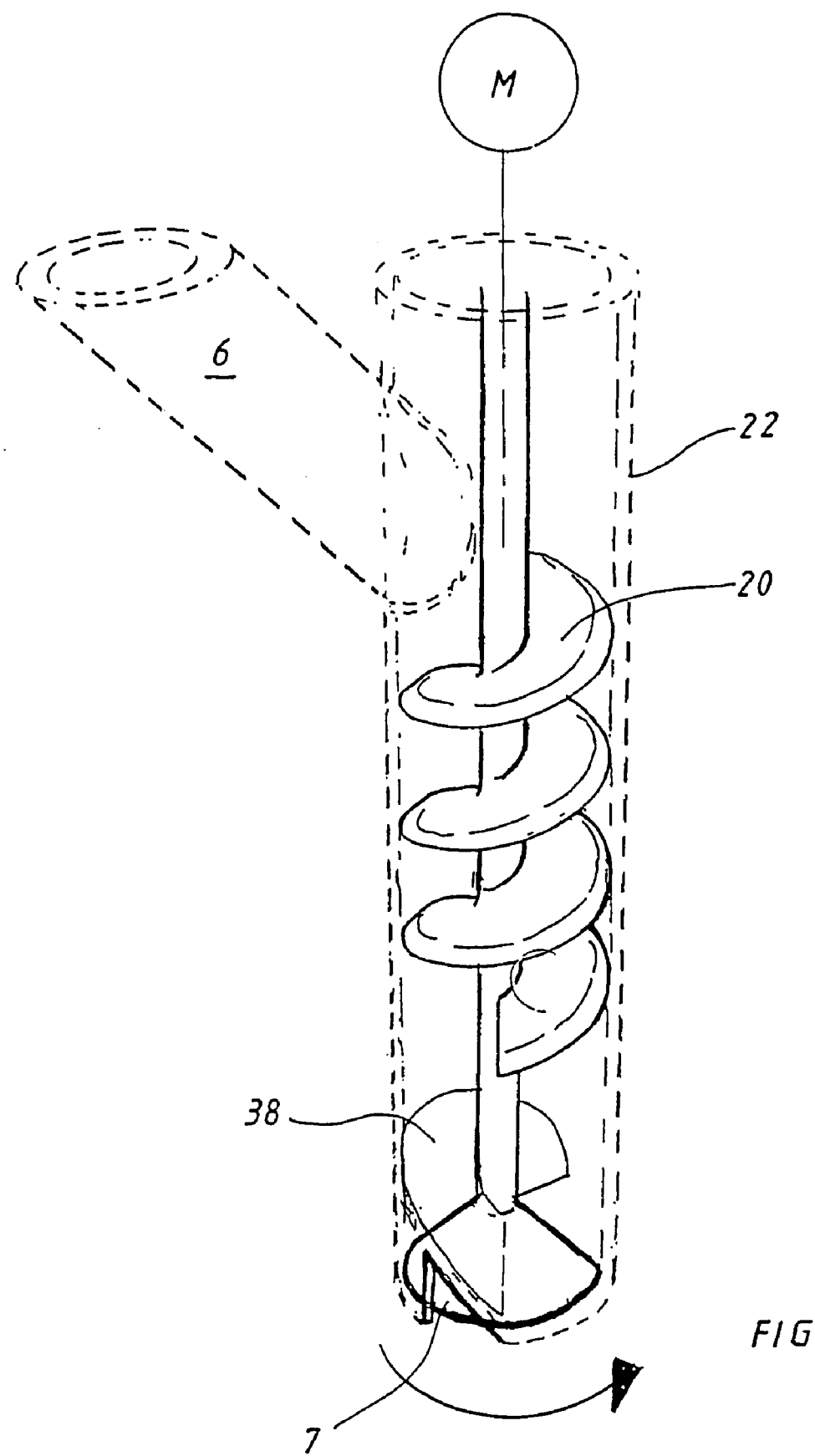
Figure 19:
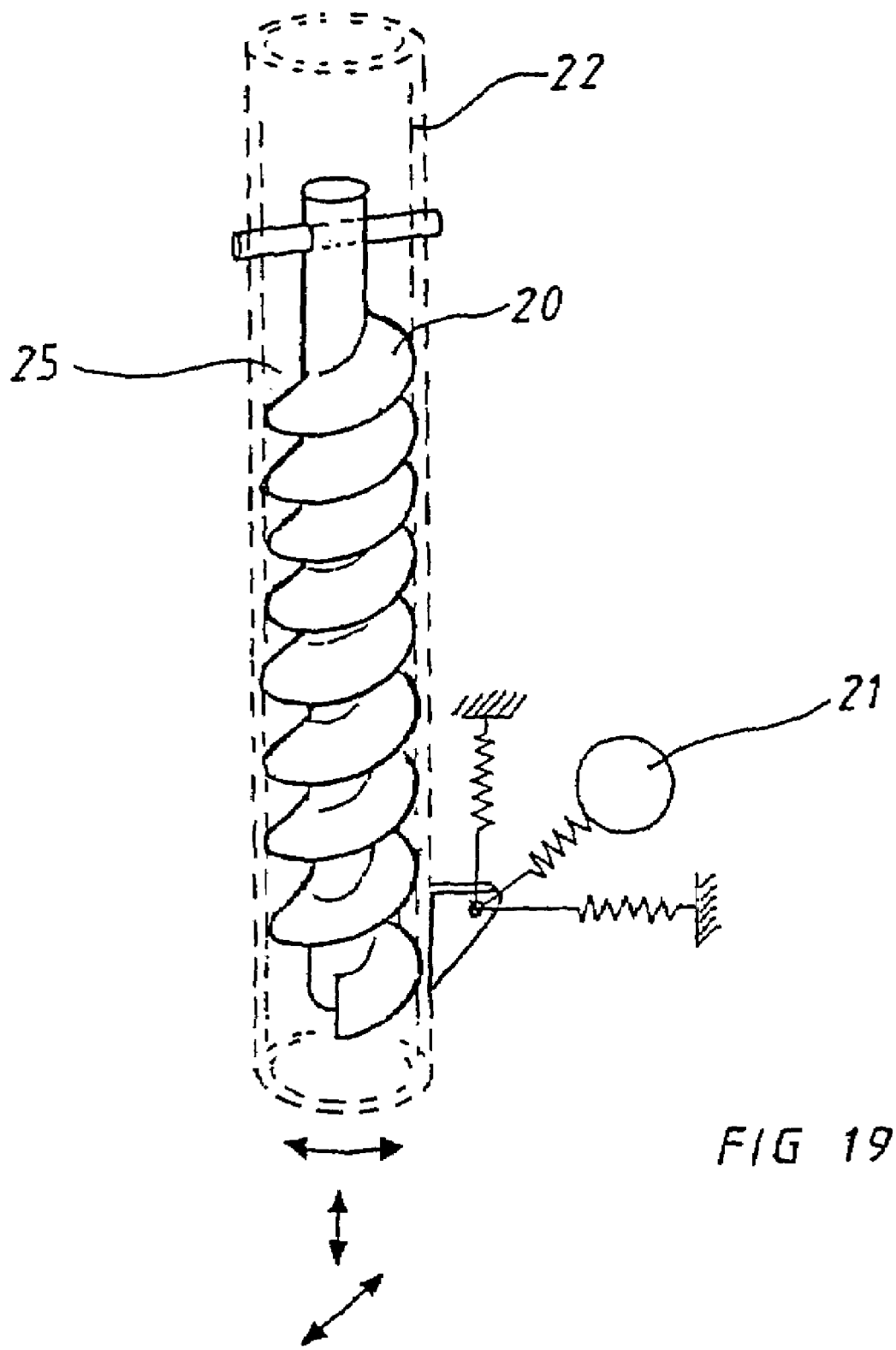
Figure 20:
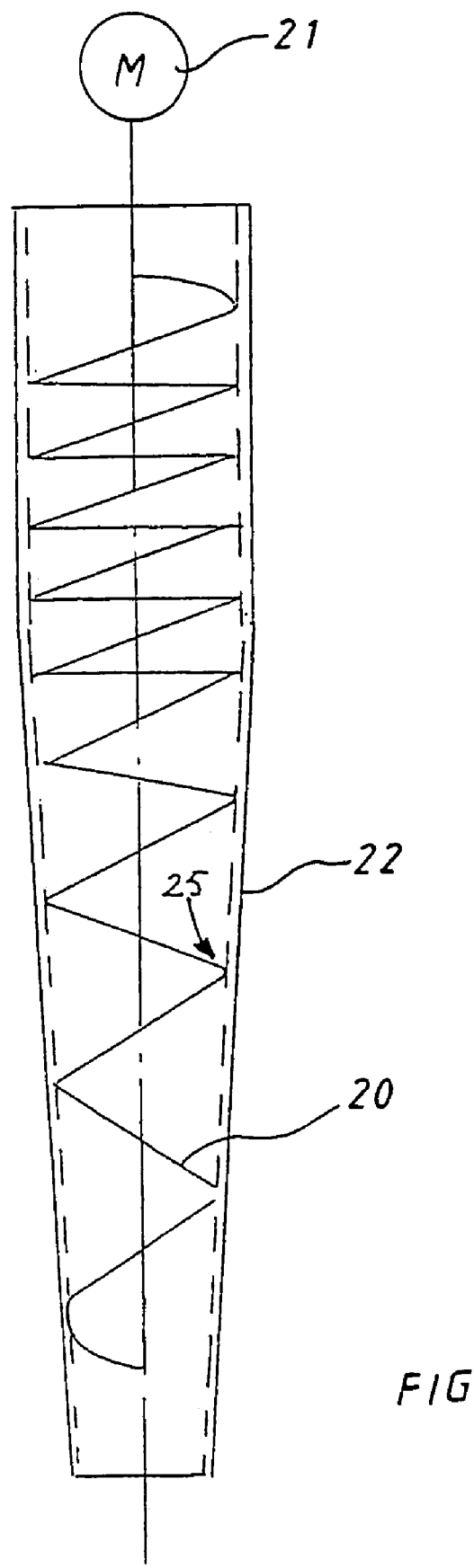
Figure 21:
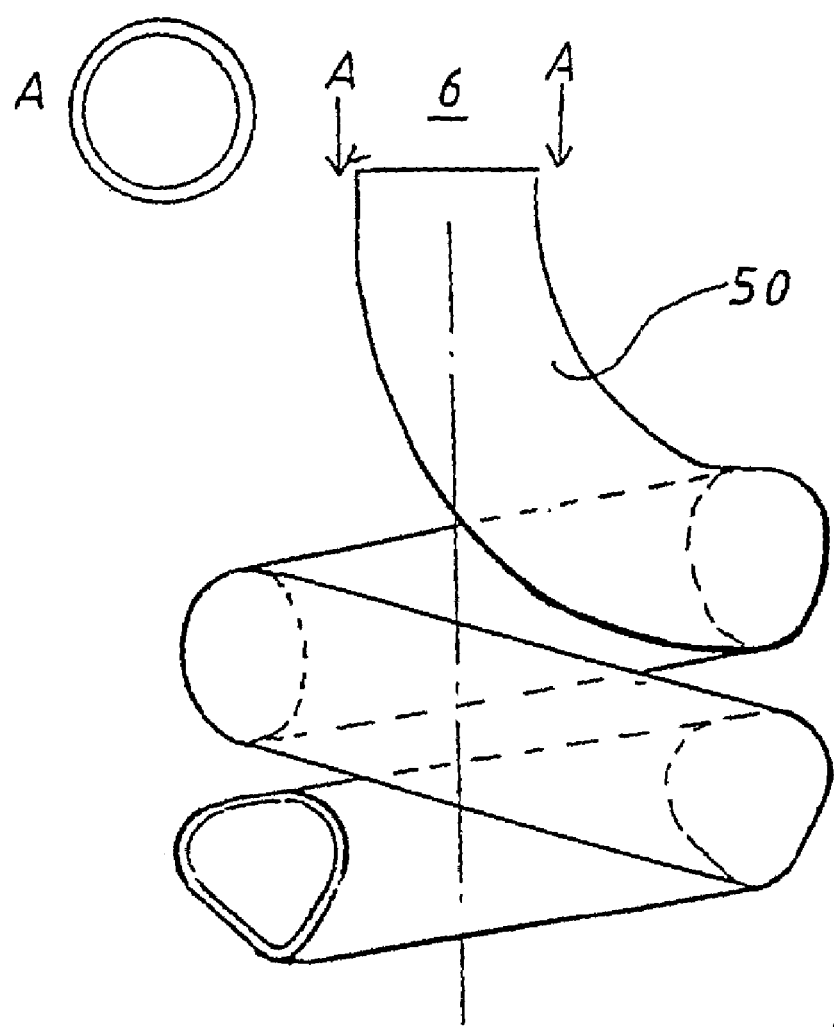
Figure 22:
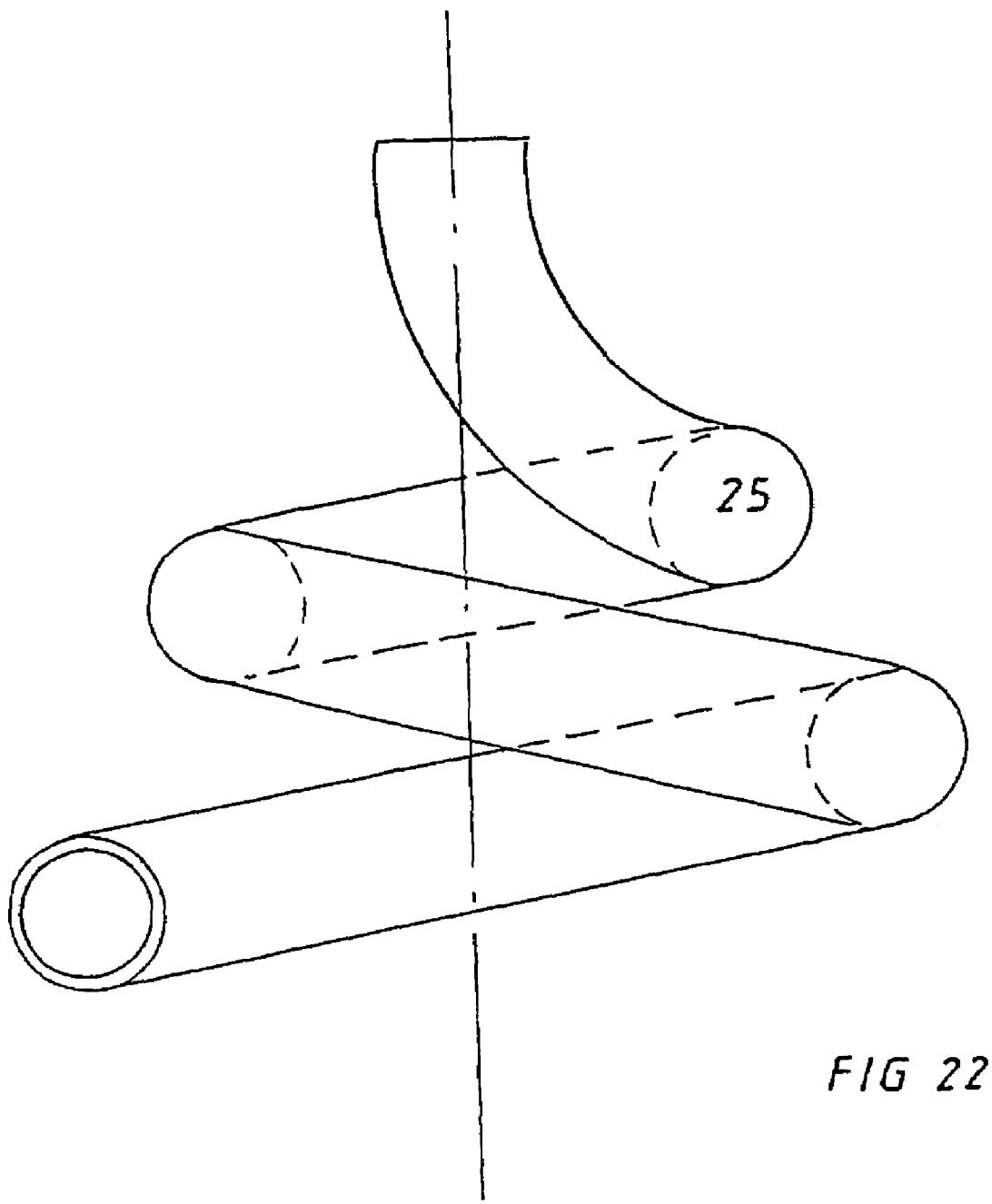

The invention will be described in more detail below with reference to the attached drawings, in which:

FIG. 1 shows an apparatus according to the invention arranged at a coulter,

FIG. 2 illustrates an agricultural machine with pneumatic delivery provided with the apparatus according to FIG. 1, FIG. 3 illustrates an agricultural machine with mechanical delivery provided with the apparatus shown in FIG. 1, FIG. 4 is a partial enlargement of the agricultural machine shown in FIG. 2, FIGS. 5a-5d is a side view of a first embodiment of the device, FIGS. 6a-6d illustrate a second embodiment of the invention, FIGS. 7 illustrates a third embodiment of the invention, FIGS. 8a-8e illustrate a fourth embodiment of the invention, FIGS. 9a-9d illustrate a fifth embodiment of the invention, FIGS. 10a-10f illustrate sixth to eleventh embodiments of the invention, FIGS. 11a-11c illustrate twelfth to fourteenth embodiments of the invention, FIG. 12 illustrates fifteenth to nineteenth embodiments of the invention, FIG. 13 illustrates a twentieth embodiment of the invention, FIG. 14 illustrates a twenty-first embodiment of the invention, FIG. 15a-15b illustrates a twenty-second embodiment of the invention, FIG. 16 illustrates a twenty-third embodiment of the invention, FIG. 17a-17b illustrates a twenty-fourth embodiment of the invention, FIG. 18 illustrates a twenty-fifth embodiment of the invention, FIG. 19 illustrates a twenty-sixth embodiment of the invention, FIG. 20 illustrates a twenty-seventh embodiment of the invention, FIG. 21 illustrates a twenty-eighth embodiment of the invention, and FIG. 22 illustrates a twenty-ninth embodiment of the invention.

Figure 23:
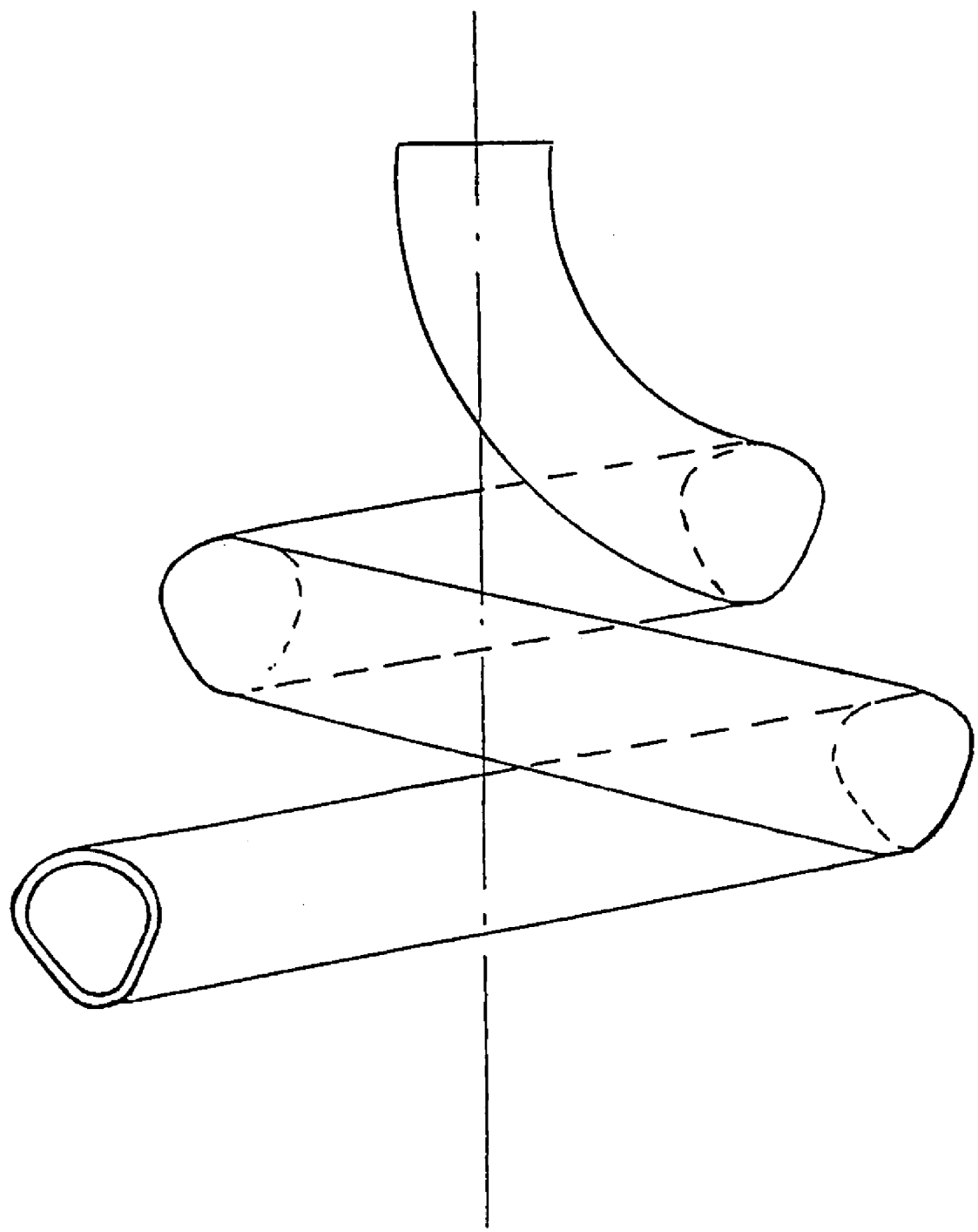

FIG. 23 illustrates a thirtieth embodiment of the invention.

DETAILED DESCRIPTION

FIG. 1 shows an apparatus 2 for discrete distribution of granules 4, such as seed, fertiliser or the like device, having an inlet 6 and an outlet 7 for the granules 4. The outlet 7 is connected to a coulter 8 of an agricultural machine 10 (see FIG. 2) pulled by a tractor 11. The seeds are blown by means of a not shown pneumatic source to the apparatus 2 through tubings 12 from a container 13.

It should be noted that the apparatus 2 has been shown schematically in FIG. 1. It should thus be understood that the apparatus 2 may be anyone of the below described embodiments. It should also be understood that the apparatus 2 may be an integrated part of the coulter 8.

Common for all embodiments is that the apparatus 1 is adapted to be driven by a power source, for causing at least a part of the apparatus to rotate and/or to vibrate. In the first case, the speed of rotation may be proportional to the supply of material through the inlet. It may also be proportional to the drive speed of the agricultural machine 10.

In FIG. 3 the granules fall down into the apparatus 2 by means of a roller arranged in the container 13. A radar 15 directed obliquely downwards for detecting the speed of the agricultural machine relative to the ground. The radar can of course be arranged on the tractor 11 instead. In the cab of the tractor 11 there is provided a control panel 16 for controlling the distribution of the granules in the soil, i.e. the distance between the granules. A computer associated with the control panel controls the apparatus 2, so that the distance between the granules is substantially the same, irrespective of the speed of the equipment. Alternatively, or in addition to this, the speed of the agricultural machine can be detected by a wheel 17.

FIG. 4 shows the apparatus 2 according to a first embodiment arranged on a coulter.

In FIGS. 5a-5c the apparatus 2 illustrated in FIG. 4 is shown in further detail. A frusto-conical distributing member 20 is rotatably arranged in a housing 22, defining together with the distributing member 20 a space. A power source 21 in the form of an electric motor is provided. Of course, the power source may instead be pneumatic, hydraulic, electromagnetic or be a mechanic transmission.

Alternatively, the power source may cause the housing and/or the distributing member to vibrate. In that case, the frusto-conical member may be rotatable. However it may alternatively be static relative to the housing 22.

The frusto-conical distributing member 20 is arranged with only a small gap in relation to an angled portion 24 of the housing 22. The angled portion 24 and the periphery of the frusto-conical distributing member 20 form together a path 25 for separation of granules.

In order to promote the separation of granules, the distributing member 20 may be provided with a friction enhancing coating, whereas, the inside surface of the angled portion 24 may be provided with a friction enhancing coating close to the inlet 6 but with a friction lowering coating close to the outlet 7. Alternatively or in addition, obstacles are arranged on the inside of the housing 22 e.g. diametrically opposite to the outlet 7.

In order to keep the granules 4 in the path 25, it may be at least partly covered with a net 26 or the like. The outlet 7 from the space 23 is designed to be coupled to the coulter 8.

During operation, granules are fed through the inlet 6 to the space. The granules 4 are separated due to the friction between the distributing member and the angled portion 24.

As can be seen in FIG. 5d, fins 27 may be arranged on the distributing member 20 for quicker transportation in the circumferential direction.

The device described above is advantageously used near the ground surface (see FIGS. 1-3).

As stated above, the rotation of the distributing member 20 can be made proportional to the speed of travel. With an electrical drive, the delivery can also be stopped and started instantaneously upon lifting/lowering of the agricultural machine in order to obtain a clearly marked start of the delivery and in order to prevent loss of dressed seeds on the ground surface where birds and animals can eat them. Alternatively, a press button on the control panel 16 can be used for starting and stopping.

It has in recent times become common practice to dress the seeds during the sowing or to supply the seeds with a fluid or a powder with bacterial culture of fertiliser. It is desirable to add the fluid or powder as close to the surface of the ground as possible, since the fluid or powder is often corrosive. In this way it is possible to avoid contamination of the agricultural machine. A nozzle 28 for delivering a surface-treating agent for the material, so-called seed dressing, is for this purpose arranged in the space 23.

With the proposed device, an agent can easily be added without impairing the function of the machine or of the device. The agent is preferably added via a nozzle, which sprays the agent down towards the plate.

The device can of course be provided with more than one inlet. Likewise, it can be provided with more than one outlet.

It should be noted that the housing may be rotated instead of the distributing member. Likewise, the housing and the distributing member may be rotated in opposite directions or in the same direction however with different speeds.

FIGS. 6a to 6c illustrate a second embodiment of the apparatus 2. The housing 22 is frusto-conically shaped, the inlet 6 enters the housing 22 at a portion of the housing having a relatively small diameter, whereas the outlet 7 is arranged at a portion having a relatively large diameter. Inside the housing, an upper conically shaped distributing member 20a and a lower conically shaped distributing member are arranged.

As shown in FIG. 6b, the upper and the lower distributing members 20a, 20b have a common axis 30 and are commonly driven by the motor 21. The upper distributing member 20a has a smaller base diameter than the lower distributing member 20b. The angled portions 24a and 24b respectively, are arranged close to the base of the conically shaped distributing members 20a and 20b, respectively, and define paths 25a, 25b, respectively. Thus, the peripheral velocity of the distributing member 20a relative to the angled portion 24a will be lower than the peripheral velocity of the distributing member 20b relative to the angled portion 24b. Thus, a granule in the path 25b will have a higher speed than in the path 25a. Thus, separation of the granules is achieved not only by the friction of the walls defining the paths, but also due to increasing speeds.

In FIG. 6c is shown that equally large cones without bottoms may be arranged on top of one another. The angled portion 24a of the housing, is however not directed towards the base of the cone 20a, but towards a portion closer to the top of the cone, and thus forming the path 25a. Also in this case, granules in the path 25a will have a lower speed in the path 25a than in the path 25b.

In FIG. 6d is shown a vibration promoting device 21 causing the a housing to vibrate. Vibration will cause the granules to travel along the path 25a to the path 25b and through the outlet, while being separated.

FIG. 7 shows a housing 22 having circular cylindrical portions adapted to the size of different cones 20. The angled portion 24 may thus be substantially parallel to the axis 30. Openings 31 are provided for allowing granules to fall from an upper cone to a lower cone. The openings are arranged at an angle to one another in order to allow the granules to travel in each path over nearly the whole length of the path 25.

Figure 8A:
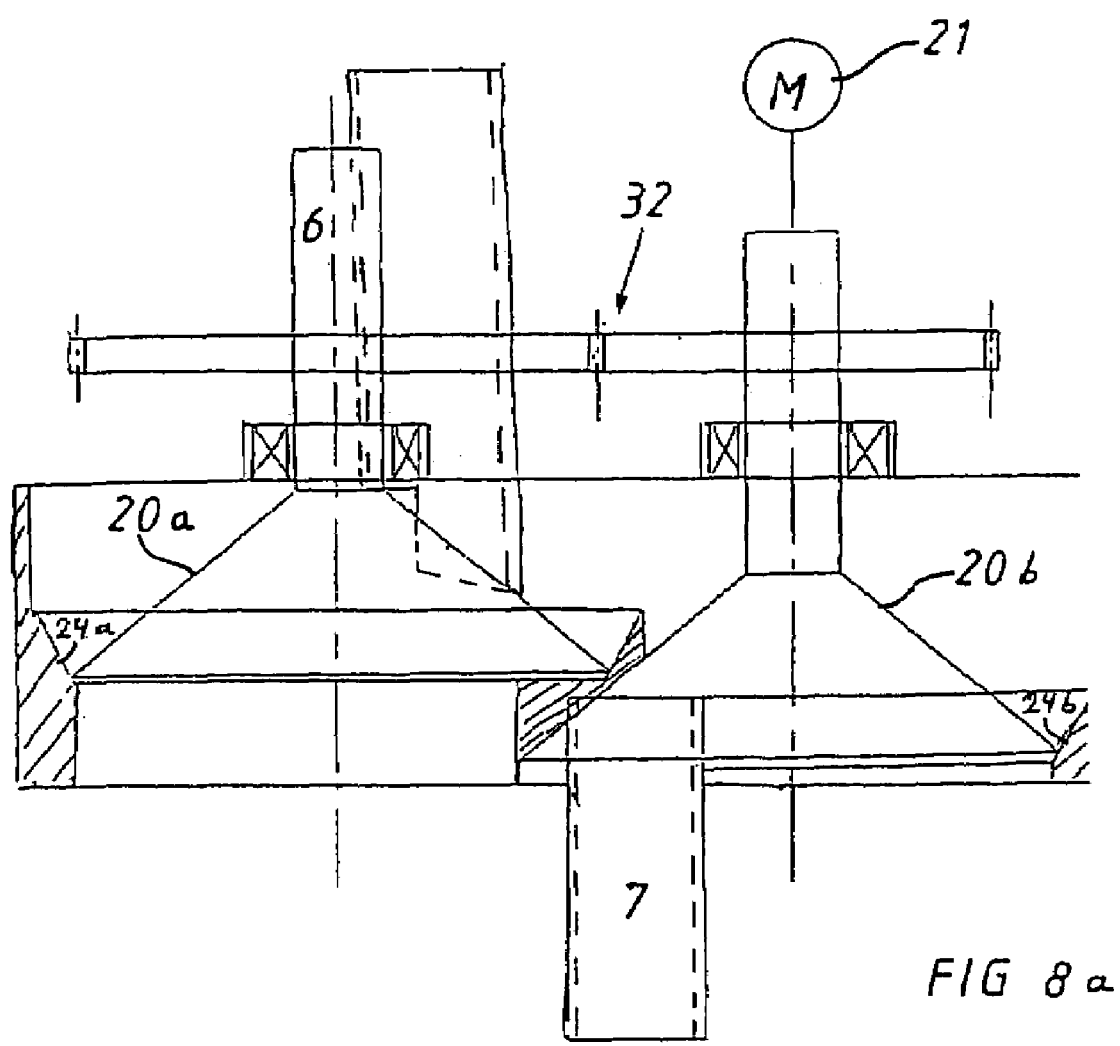
Figure 8:
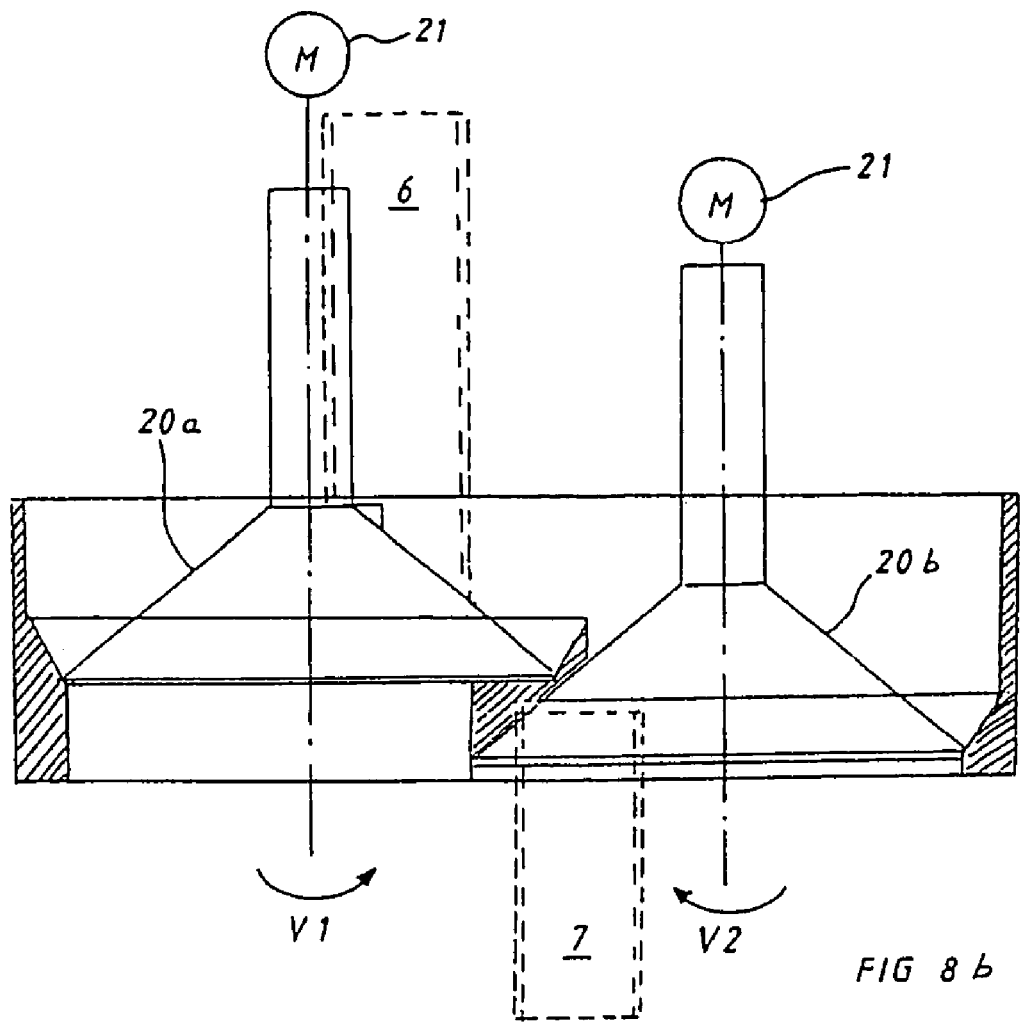
Figure 8:
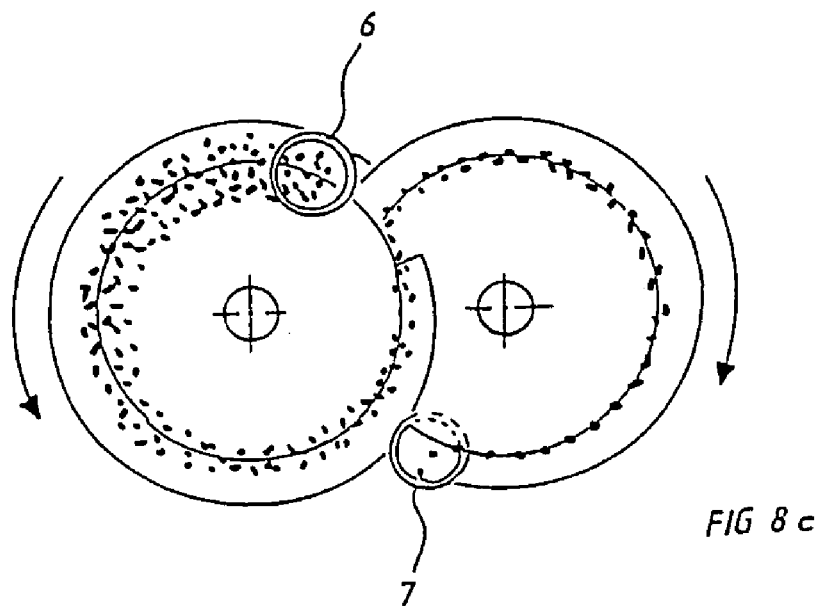

In FIG. 8a, the first and second distributing member 20a, 20b substantially in the form of cones, are arranged adjacent to one another. The second cone 20b is arranged lower than the first cone 20a. An electric motor 21 drives the second cone. A gear 32 causes the cone 20a to rotate slower than the cone 20b.

In FIG. 8b, the cone 20a has a separate motor with lower rotational speed V1 than the motor 21 of the cone 20b. Alternatively, the cones 20a and 20b are driven with the same speed, but the cone 20b is larger than the cone 20a.

FIG. 8c illustrates direction of rotation of the cones shown in FIGS. 8a and 8b, respectively.

Figure 8D:
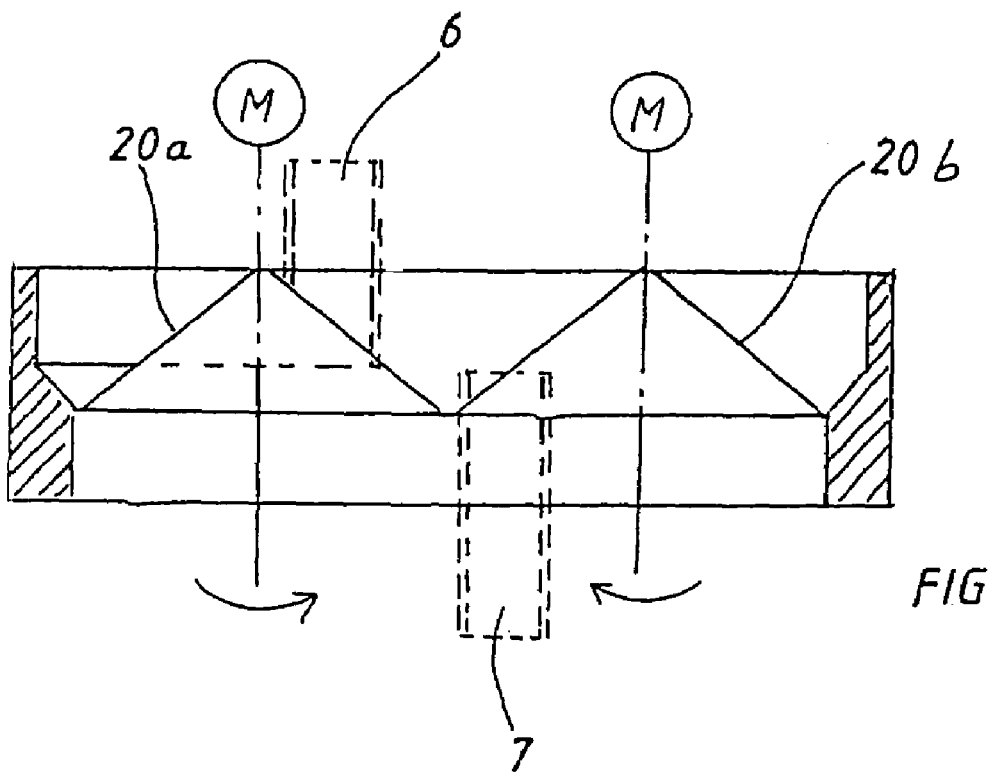
Figure 8E:
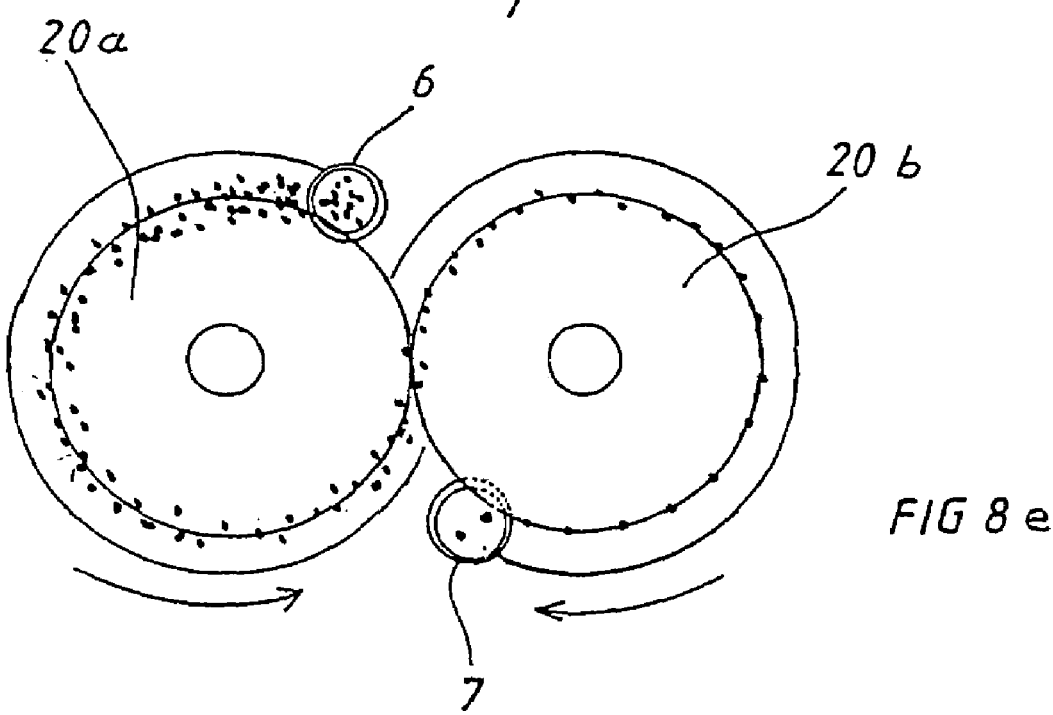

FIGS. 8d-8e shows cones of the same size arranged adjacent to one another at substantially the same level. The cones are driven in opposite directions, preferably with different speeds, i.e. the speed of the cone 20b is higher than that of the cone 20a to promote separation of the granules. Of course, the speed of the motors may be the same if cones of different diameters are used.

In FIGS. 8a-8d, the direction of rotation may be the same. In that case, the outlet 7 should be moved.

Figure 9A:
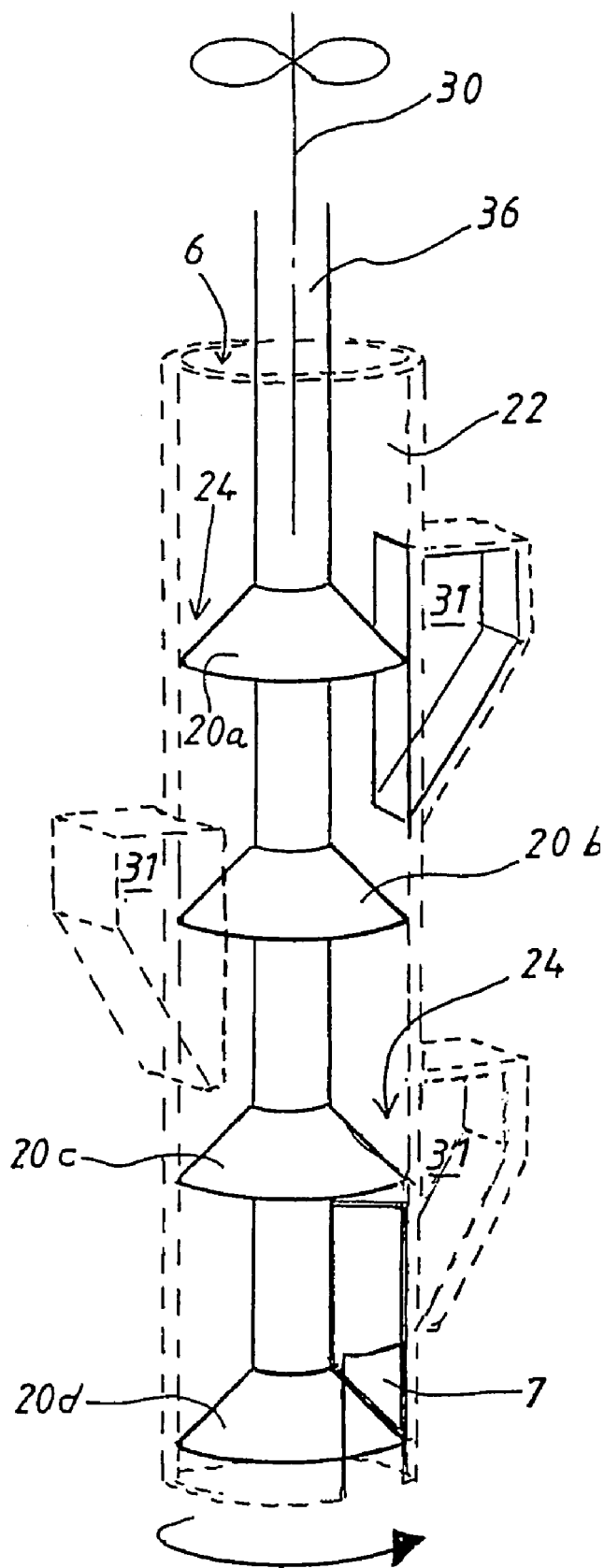

In FIG. 9a, the housing 22 is elongated and circular cylindrical. Inside the housing, first to four distributing members 20a-20d are arranged along the common axis 30. The path 25 is defined by the inside wall of the circular cylindrical housing 22 and the cone, i.e. no angled portion is provided. A pneumatic source drives a propeller connected to an axle 36 coaxial with said axis 30. Radially extending grooves in the housing allow the granules to fall from one cone to the other. As in the embodiment of FIGS. 7a, 7b, the grooves 31 are disposed about the circumference of the housing that the granules are allowed to travel over a major part of the path 25.

Figure 9B:
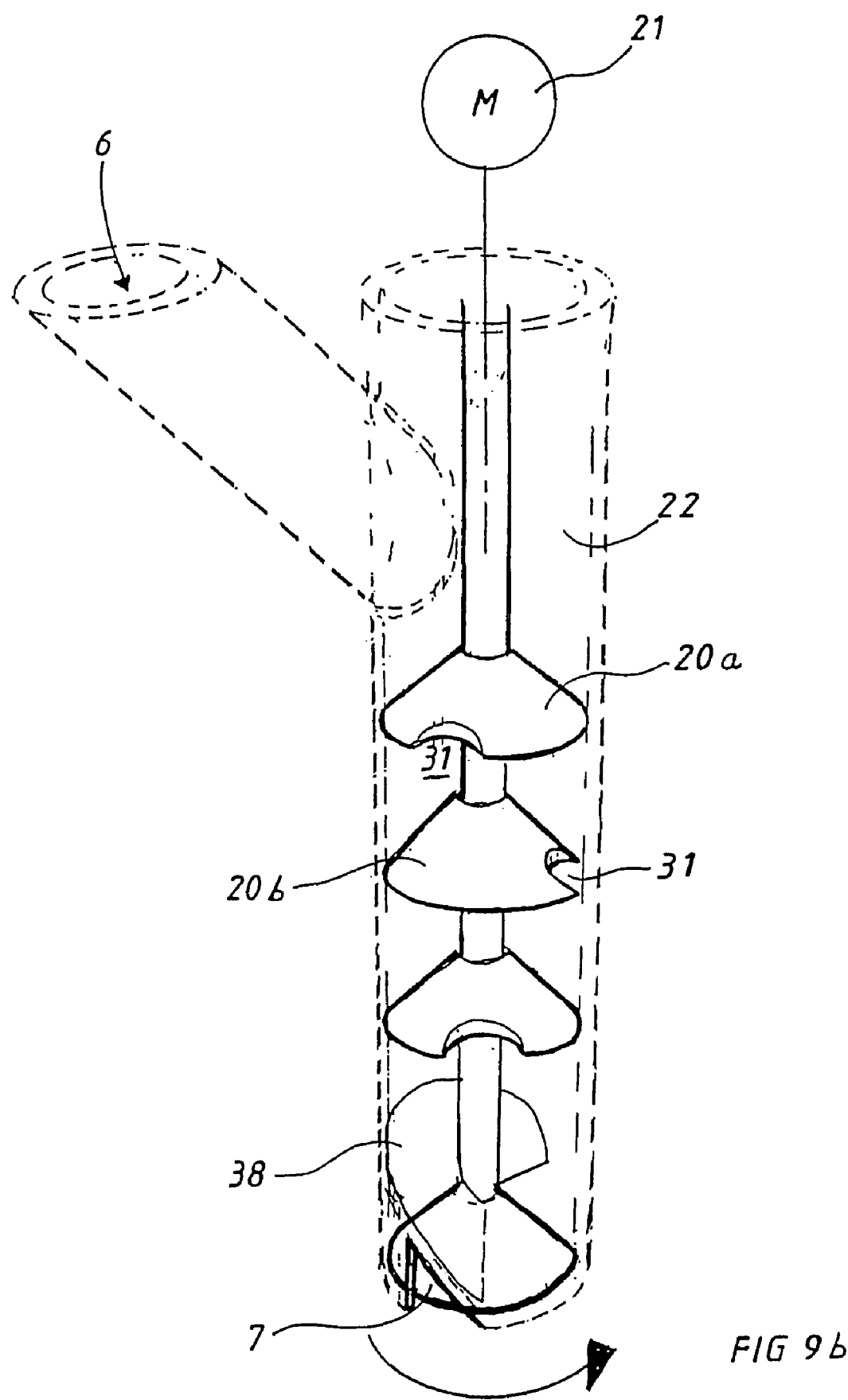

In FIG. 9b, the openings 31 in the cones allow the granules to fall from one cone to the other. A guiding element is adapted to guide the granules away from the outlet 7 and to keep the granules separated by defining the start of the lowest path.

It should be noted that in order to even more promote separation of the granules, the axle 36 and/or the cones may be provided with a gear mechanism, in order to achieve an increasing speed of the cones in the flow direction.

Figure 9C:
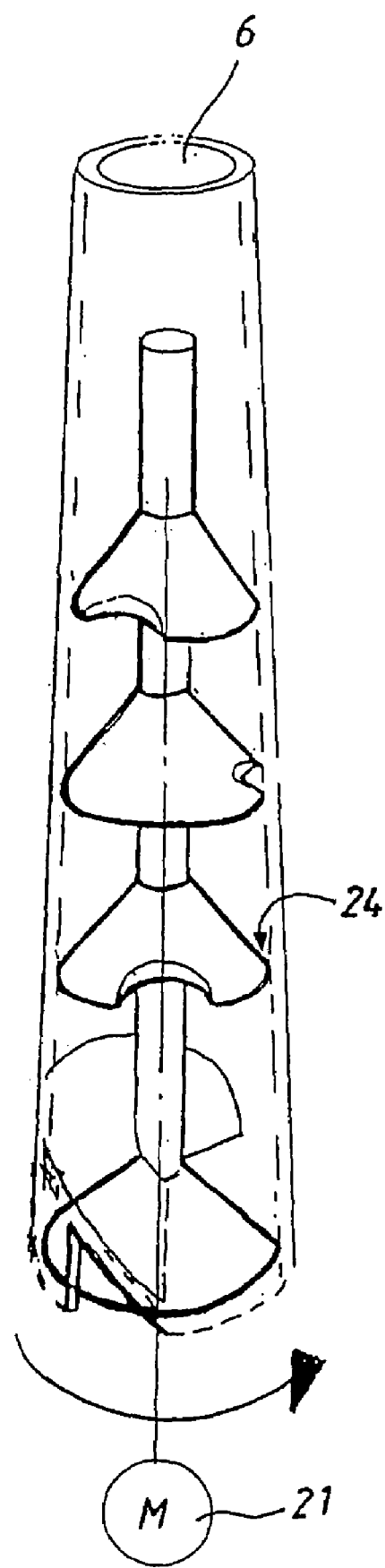
Figure 10A:
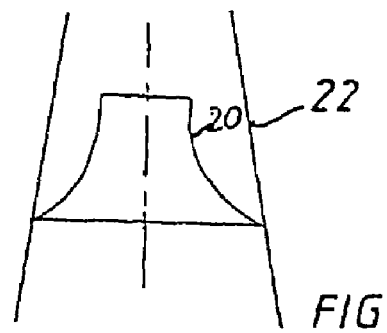
Figure 10D:
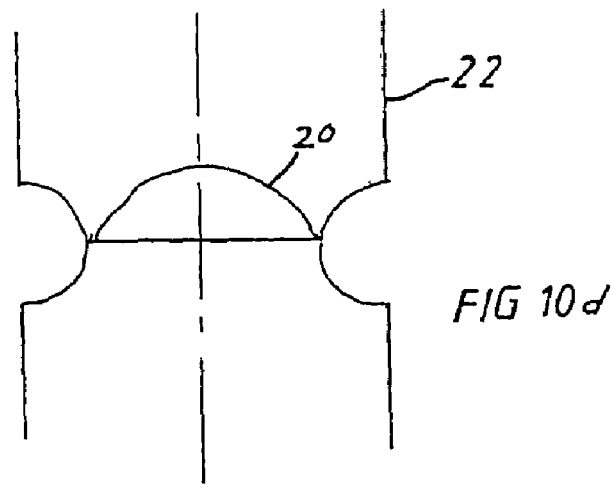
Figure 10B:
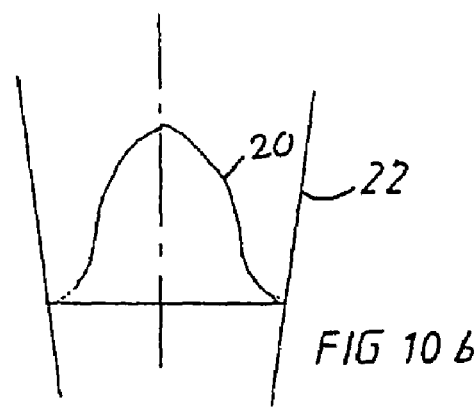
Figure 10E:
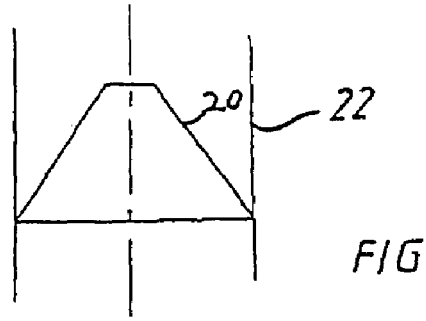
Figure 10C:
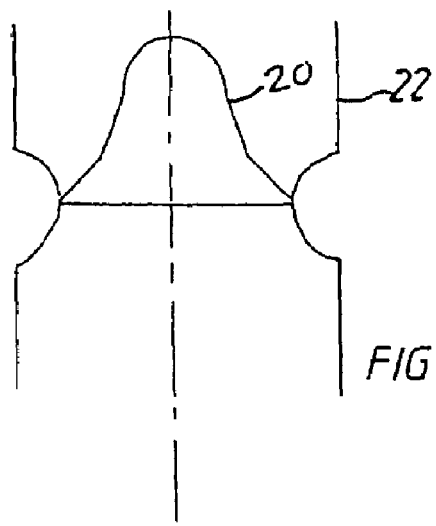
Figure 10F:
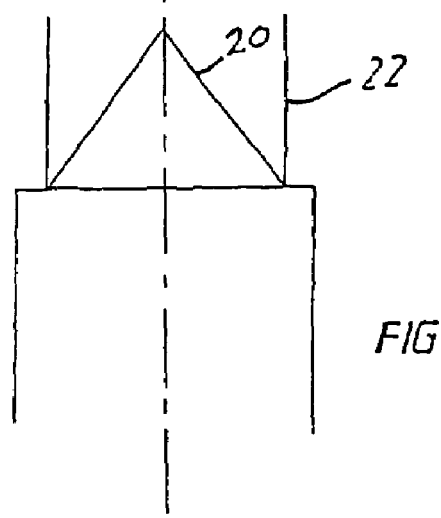

In FIG. 9c, the housing 22 is frusto-conical, the top of which being open and forming an inlet 6. The path 24 is thus formed by the conical housing and the cones.

In FIG. 9d, the housing 22 is cylindrical and the distributing members 20a-20c are provided with a helical upper surface. Of course, this embodiment may be adapted to a housing having a conical shape, as is shown in FIG. 9c.

FIGS. 10a-10f illustrate possible forms of the housing 22 and the distributing member 20. The opening 31 has been omitted for reasons of clarity. Of course, the distributing members 20 and the housings shown are interchangeable. Of course, the shown housings and distributing members are also applicable in the embodiments shown in FIGS. 5a-9c.

In FIG. 11a, the member 40 is a flexible ring of e.g. rubber to be arranged on the bottom edge of a cone. Depending on the size of the flexible ring, it may constitute the whole distributing member 20.

In FIG. 11b, a standard V-ring arranged on a circular cylindrical axle. The V-ring thus constitutes the distributing member 20.

In FIG. 11c, bristles are arranged radially at the bottom of the cone to fill out the gap between the cone and the housing.

In FIG. 12, the housing has a plurality of spherically formed portions. Inside the housing, distributing members of different shapes are shown. Of course, each portion may be a single housing having one of the distributing members shown in the figure, or in any of the FIGS. 5a-9c. Also in this case, a gear mechanism may be provided (cf. FIGS. 9a-9b).

In FIG. 13 the housing 22 as well as an axle 42 is circular cylindrical and has different levels of angled portions 24a-24d. The angled portions 24a-24d are also arranged at increasing distances from one another to promote separation of the granules. As above, the openings 31 are arranged at different circumferential positions. The axle 42 may however have an increasing diameter from the top in order to increase the speed of the granules in the flow direction.

In FIG. 14, angled portions 24a-24c point radially towards the circular cylindrical axle 42. The angled portions have an increasing angle relative to the axle 42, i.e. the path is narrower the farther down in the housing. In the bottom of the axle 42, a further distributing member 20 is arranged in the form of a cone. Of course, the cone could be replaced by a further angled portion. The openings 31 have been omitted for reasons of clarity.

In FIG. 15a, the a helical angled portion 24 has been arranged on the inside of the housing. The helical angled portion points towards the rotatable axle 42. The helical angled portion 24 has a increasing pitch in order to promote separation of the granules, since their speed will increase due to the increasing pitch. The helical portion may however have an increasing pitch in combination with a housing and/or an axle 42 of an increasing diameter in the flow direction.

In FIG. 15b, the motor drives a belt, which in turn drives the housing 22, while the axle is fixed. I would alternatively be possible to turn only the angled portion 24, while keeping either of the housing and the axle or both of them still It should be noted that in all the above described embodiments, it is possible to turn the housing instead of the axle or distributing member In FIG. 16, a first portion 22a of the housing is rotatable, whereas a second portion 22b is fixed. A first distributing member 20a is a conical top of the lower portion 22b, and is thus fixed. A second distributing member 20b is connected to the first portion 22a, and is consequently rotatable.

In FIG. 17a, the distributing member 20 is a rotatable helical member of increasing pitch and the housing 22 is circular cylindrical. Owing to the increasing pitch and/or rotation speed, the separation of the granules is promoted.

In FIG. 17b, the housing is rotatable and the helical member 22 is fixed.

It should be noted that the helical angled portion shown in FIGS. 15a, 15b and 17a-20 may be angled increasingly (cf. FIG. 14). This may be performed step-wise or continuously.

In FIG. 18 the distributing member 20 is a rotatable helical member and the housing 22 is circular cylindrical. A gap is provided between the guide member 38, which is adapted to guide the granules away from the outlet 7 and to keep the granules separated by defining the start of the lowest path.

In FIG. 19, the distributing member 20 is a helical member of decreasing pitch and fixedly connected to the is circular cylindrical housing 22. The vibrating device 21 causes the housing and the distributing member to vibrate, and thus to cause the granules to be transported along and to be separated in the path 25.

In FIG. 20, the distributing member is helical and the housing is partly tubular and partly conical, however truncated, i.e. the with decreasing cross-section. In order to promote separation of granules in the conical portion, the pitch of the helices is increasing more than what is the case e.g. in the embodiment of FIG. 17, i.a. due to increasing area of the path 25.

It should be noted that the embodiments shown in FIGS. 15a-20 may also be passive, i.e. only be influenced by gravity.

In FIG. 21, a helical tube 50 having a circular cross-section at the inlet 6 and a partly V-shaped cross-section at the outlet 7 is turned, vibrated or solely influenced by gravity. The number of turns of the helice may be a part of a turn, one turn or many more than just two. The V-shaped cross-section promotes separation of the granules.

In FIG. 22, a conical helical tube is shown, i.e. with increasing diameter in the flow direction. The farther down a granules travel in the path 25, the higher the speed; separation of the granules is thus promoted. In this embodiment, the tube 50 is shown as having a constant circular cross-section.

In FIG. 23, the conical helical tube of FIG. 22 has been provided with a V-shape cross-section for promoting separation of the granules.

The cross-section of the conical helical tube of FIGS. 22 or 23 may in addition or alternatively be provided with an increasing cross-section in order to prevent clogging of the tube by granules.

The distributing members shown above as cones may, in order to improve separation of the granules, be selected such that the top angle is smaller the farther down in the housing they are situated.

It should be noted that the provision of friction enhancing and/or friction lowering coatings and/or obstacles, as discussed in connection with FIGS. 5a-5c, is applicable to all the above described embodiments.

It should also be noted that the provision of a net 26 for keeping the granules in the path 25, is applicable to the embodiments of FIGS. 5a-14 and 16.

The invention claimed is:

1. An apparatus for discrete distribution of granules, comprising:
   a path forming device having an inlet adapted to be associated with a granules container of an agricultural machine, an outlet adapted to be associated with a coulter of the agricultural machine, and a first distributing member within a housing,
   wherein a path for the granules is formed by said first distributing member and an inside of said housing, the path including downwardly sloping surfaces extending from at least one of (a) the inside of said housing and (b) a center of said first distributing member, and
   wherein said path is formed about a substantially vertical axis.

2. An apparatus according to claim 1, wherein one of said housing and said first distributing member is rotatably arranged.

3. An apparatus according to claim 1, wherein both of said housing and said first distributing member are rotatably arranged.

4. An apparatus according to claim 3, wherein said housing and said first distributing member are rotatably arranged in opposite directions.

5. An apparatus according to claim 3, wherein said housing and said first distributing member are arranged to be rotatable in the same direction at different speeds.

6. An apparatus according to claim 1, wherein one of said housing and said first distributing member is arranged in a fixed relationship, and is adapted to be associated with a vibration device.

7. An apparatus according to claim 1, further comprising a guide member arranged to retain the granules in the path, at least in proximity to the outlet.

8. An apparatus according to claim 7, wherein the guide member covers substantially the whole path.

9. An apparatus according to claim 1, wherein a surface of at least one of said first distributing member and the housing is made of a flexible material.

10. An apparatus according to claim 1, further comprising at least one further distributing member downstream of said first distributing member and in the housing.

11. An apparatus according to claim 10, wherein said further distributing member is arranged such that during use, the path of said first distributing member and a path of said further distributing member are at least partly in the same horizontal plane.

12. An apparatus according to claim 10, wherein said further distributing member is arranged such that a path thereof is in a plane lower than the path of said first distributing member.

13. An apparatus according to claim 10, wherein the first distributing member and the further distributing member are associated with a power source in such a way that they have substantially the same speed.

14. An apparatus according to claim 10, wherein the first distributing member and the further distributing member are associated with a power source in such a way that the further distributing member has a higher speed than the first distributing member.

15. An apparatus according to claim 10, wherein both of said first distributing member and said further distributing member are rotatably arranged, and wherein said further distributing member has a higher peripheral velocity that that of the first distributing member.

16. An apparatus according to claim 15, wherein said first distributing member has a first peripheral circular cross-section and, wherein said further distributing member has a second peripheral circular cross-section, said second cross-section having a larger diameter than that of said first cross-section.

17. An apparatus according to claim 15, wherein said first distributing member has a first peripheral circular cross-section and, wherein said further distributing member has a second peripheral circular cross-section, said first cross-section and said second cross-section being substantially the same.

18. An apparatus according to claim 1, wherein said first distributing member is helically shaped with constant pitch.

19. An apparatus according to claim 1, wherein said first distributing member is helically shaped with a pitch increasing in the direction of flow.

20. An apparatus according to claim 1, wherein said housing is at least partly tubular.

21. An apparatus according to claim 1, wherein said housing is at least partly conical in the direction of flow.

22. An apparatus according to claim 1, wherein said housing is at least partly spherical.

23. An apparatus according to claim 1, wherein at least a part of said path is bounded by a friction enhancing surface.

24. An apparatus according to claim 1, wherein at least a part of said path is bounded by a friction reducing surface.

25. An apparatus according to claim 1, wherein said first distributing member has, from a central axis thereof, a downward sloping surface towards an inside wall of the housing.

26. Agricultural machine comprising a container for granules and a coulter for placing granules at a predetermined depth in the soil, wherein the machine comprises an apparatus according to claim 1, said apparatus being associated with the container and with the coulter.

27. An apparatus for discrete distribution of granules, comprising:
   a path forming device having an inlet adapted to be associated with a granules container of an agricultural machine, and an outlet adapted to be associated with a coulter of the agricultural machine,
   wherein a path formed by said path forming device is defined by at least one wall extending on at least one side of and along at least a part of the extension of said path, wherein said path is formed about a substantially vertical axis, and wherein said path is formed by a helical tube.

28. An apparatus according to claim 27, wherein the helical tube forms at least a part of a cone.

29. An apparatus according to claim 27, wherein at least a portion of said helical tube has substantially a V-shaped cross-section, forming said path.

* * * * *